US012745776B2

(12) United States Patent
Mertoglu et al.

(10) Patent No.: US 12,745,776 B2
(45) Date of Patent: Sep. 29, 2026

(54) PPO FORMULATIONS CONTAINING ETHER SULFATES

(71) Applicant: BASF SE, Ludwigshafen (DE)

(72) Inventors: Murat Mertoglu, Limburgerhof (DE); Ingo Meiners, Limburgerhof (DE); Jochen Schreieck, Limburgerhof (DE); Douglas Findley, Research Triangle Park, NC (US); Tobias Seiser, Mannheim (DE); Henning Urch, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 801 days.

(21) Appl. No.: 17/793,494

(22) PCT Filed: Jan. 14, 2021

(86) PCT No.: PCT/EP2021/050694

§ 371 (c)(1),
(2) Date: Jul. 18, 2022

(87) PCT Pub. No.: WO2021/148304

PCT Pub. Date: Jul. 29, 2021

(65) Prior Publication Data

US 2023/0096769 A1 Mar. 30, 2023

Related U.S. Application Data

(60) Provisional application No. 62/964,874, filed on Jan. 23, 2020, provisional application No. 62/964,861, filed on Jan. 23, 2020, provisional application No. 62/964,868, filed on Jan. 23, 2020.

(30) Foreign Application Priority Data

May 5, 2020 (EP) .................................... 20172833
May 5, 2020 (EP) .................................... 20172834
May 5, 2020 (EP) .................................... 20172837
Oct. 6, 2020 (EP) .................................... 20200249

(51) Int. Cl.

*A01N 57/20* (2006.01)
*A01N 33/12* (2006.01)
*A01N 43/54* (2006.01)
*A01N 43/84* (2006.01)
*A01P 13/00* (2006.01)
*A01P 13/02* (2006.01)

(52) U.S. Cl.

CPC ............. *A01N 57/20* (2013.01); *A01N 33/12* (2013.01); *A01N 43/54* (2013.01); *A01N 43/84* (2013.01); *A01P 13/00* (2021.08); *A01P 13/02* (2021.08)

(58) Field of Classification Search

CPC ........ A01N 57/20; A01N 33/12; A01N 43/54; A01N 43/84; A01P 13/00; A01P 13/02
See application file for complete search history.

(56) References Cited

U.S. PATENT DOCUMENTS 4,400,196 A 8/1983 Albrecht et al.
6,159,900 A 12/2000 Bieringer et al.
8,563,018 B2 10/2013 Burke
10,091,994 B2 * 10/2018 Schnabel ............... A01N 57/20
(Continued)

FOREIGN PATENT DOCUMENTS

CN 1300542 A 6/2001
CN 103783064 A 5/2014
(Continued)

OTHER PUBLICATIONS

Selby et al.; "Broad-Spectrum PPO-Inhibiting N-Phenoxyphenyluracil Acetal Ester Herbicides"; ACS Publications; Discovery and Synthesis of Crop Protection Products; Chapter 20, pp. 277-289 (2015) (Year: 2015).*
(Continued)

*Primary Examiner* — Robert A Wax
*Assistant Examiner* — John W Lippert, III
(74) *Attorney, Agent, or Firm* — MARSHALL, GERSTEIN & BORUN LLP

(57) ABSTRACT

The invention relates to a liquid herbicidal composition comprising a) protoporphyrinogen-IX oxidase inhibitors, or an agrochemically acceptable salt, stereoisomer, tautomer, or N-oxide thereof, and b) a compound of formula (I) $[R-(A)_x-OSO_3-]-M^+$; wherein the protoporphyrinogen-IX oxidase inhibitor is a compound of formula (II) and wherein al variables have a meaning as defined herein. The invention also relates to a method for controlling undesirable vegetation, which method comprises applying the herbicidal composition to a locus where undesirable vegetation is present or is expected to be present.

(II)

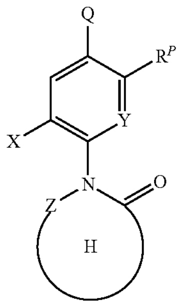

7 Claims, No Drawings

(56) References Cited

U.S. PATENT DOCUMENTS

| | | | | |
|---|---|---|---|---|
| 2005/0266995 | A1 | 12/2005 | Frisch et al. | |
| 2015/0361329 | A1* | 12/2015 | Jakobs-Sauter | C09K 8/602 507/239 |
| 2016/0015028 | A1 | 1/2016 | Schnabel | |
| 2018/0303091 | A1 | 10/2018 | Van Durme et al. | |
| 2019/0059374 | A1 | 2/2019 | Pawlak, II et al. | |
| 2021/0163446 | A1* | 6/2021 | Kiji | C07D 401/12 |
| 2023/0072815 | A1 | 3/2023 | Mertoglu et al. | |

FOREIGN PATENT DOCUMENTS

| | | | | |
|---|---|---|---|---|
| CN | 104222101 | A | 12/2014 | |
| DE | 19501986 | A1 | 7/1996 | |
| EP | 0656416 | A1 | 6/1995 | |
| JP | 2012-525413 | A | 10/2012 | |
| JP | 2023-511936 | A | 3/2023 | |
| WO | WO-00/78139 | A2 | 12/2000 | |
| WO | WO-2005/055719 | A1 | 6/2005 | |
| WO | WO-2012/113830 | A1 | 8/2012 | |
| WO | WO-2016/121895 | A1 | 8/2016 | |
| WO | WO-2019212888 | A1 * | 11/2019 | A01N 25/30 |
| WO | WO-2019240082 | A1 * | 12/2019 | |

OTHER PUBLICATIONS

Google Search; lauryl ether sulfate ammonium (accessed Mar. 2025) (Year: 2025).*
What is the structure of epyrifenacil—Google Search (Year: 2025).*
Is epyrifenacil soluble in water—Google Search (Year: 2025).*
European Search Report for EP Patent Application No. 20172833.4, Issued on Oct. 9, 2020, 3 pages.
European Search Report for EP Patent Application No. 20172834.2, Issued on Oct. 9, 2020, 4 pages.
European Search Report for EP Patent Application No. 20172837.5, Issued on Oct. 9, 2020, 3 pages.
International Application No. PCT/EP2021/050691, International Search Report and Written Opinion, mailed May 7, 2021.
International Application No. PCT/EP2021/050694, International Search Report and Written Opinion, mailed May 10, 2021.
International Application No. PCT/EP2021/050689, International Search Report and Written Opinion, mailed May 10, 2021.

* cited by examiner

PPO FORMULATIONS CONTAINING ETHER SULFATES

CROSS-REFERENCE TO RELATED APPLICATIONS

This is the U.S. national phase of International Application No. PCT/EP2021/050694, filed Jan. 14, 2021, which claims the benefit of U.S. Provisional Patent Application No. 62/964,861, filed Jan. 23, 2020, U.S. Provisional Patent Application No. 62/964,868, filed Jan. 23, 2020, U.S. Provisional Patent Application No. 62/964,874, filed Jan. 23, 2020, each incorporated herein by reference, European Patent Application No. 20172833.4, filed May 5, 2020, European Patent Application No. 20172834.2, filed May 5, 2020, European Patent Application No. 20172837.5, filed May 5, 2020, and European Patent Application No. 20200249.9, filed Oct. 6, 2020.

The invention relates to a liquid herbicidal composition comprising A) a protoporphyrinogen-IX oxidase inhibitor ("PPO-inhibitor"); and B) a compound of formula (I)

$$[R-(A)_x-OSO_3^-]-M^+ \quad (I);$$

wherein the variables have a meaning as defined herein below.

Further objects are a method for controlling undesirable vegetation, which method comprises applying the herbicidal composition to a locus where undesirable vegetation is present or is expected to be present; a method for increasing the herbicidal effect of a PPO-inhibitor comprising the step of contacting the PPO-inhibitor with a compound of formula (I); the use of a compound of formula (I) for increasing the herbicidal effect of a PPO inhibitor; a method of producing the herbicidal composition comprising the step of contacting the PPO inhibitor with the compound of formula (I); plant propagation material comprising the herbicidal composition; and to a method for treating plant propagation material comprising the step of treating plant propagation material with the agrochemical composition.

There is an ongoing need to find additives for agrochemical compositions that enhance the biological effectivity of the composition, increase its physical and/or chemical stability, or increase the loading of the agrochemical composition with active ingredients and/or adjuvants. Increased biological effectivity allows for lower application rates of the active ingredient, which reduces costs and health risks for the applicant. Higher loading of agrochemical compositions reduces the weight of a given packaging unit, thereby facilitating transportation and handling of the canisters containing the agrochemical compositions. However, agrochemical compositions with higher loading of agrochemical active ingredients and/or adjuvants suffer from stability problems, such as gelling, flocculation, and creaming. Also agrochemical compositions with higher loading often have a high viscosity, which negatively affects their handling by the applicant.

U.S. Pat. No. 10,091,994B2 discloses additives for agrochemical compositions. The additives are alkoxylated and sulfonated alcohols, which are present in the form of salts and wherein the cation may be sodium.

It was the objective of the present invention to provide herbicidal compositions of PPO-inhibitors that have an increased biological effect, in particular an increased herbicidal effect against undesired vegetation, have an enhanced physical and/or chemical stability, high loading with PPO-inhibitors and/or adjuvants and at the same can be easily handled by the applicant.

It was surprisingly found that compounds of formula (I) increases the biological activity of liquid herbicidal compositions comprising PPO-inhibitors. The improved biological activity relates both the increased herbicidal effect against unwanted vegetation, to a reduced damage of certain crop plants, an increased herbicidal effect against certain other crop plants, and an enhanced defoliation effect. Further advantages are that the herbicidal compositions have a high loading with PPO-inhibitors, and that they are physically stable upon storage.

Accordingly, the invention relates to a liquid herbicidal composition comprising a) a protoporphyrinogen-IX oxidase inhibitor, or an agrochemically acceptable salt, stereoisomer, tautomer, or N-oxide thereof;
b) a compound of formula (I)

$$[R-(A)_x-OSO_3^-]-M^+ \quad (I);$$

wherein

R is $C_{10}$-$C_{16}$-alkyl, $C_{10}$-$C_{16}$-alkenyl, or $C_{10}$-$C_{16}$-alkynyl;

each A is independently a group

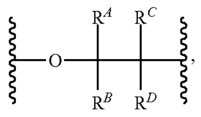

wherein $R^A$, $R^B$, $R^C$, and $R^D$ are independently H, $CH_3$, or $CH_2CH_3$ with the proviso that the sum of C-atoms of $R^A$, $R^B$, $R^C$, and $R^D$ is up to 2;

$M^+$ is a monovalent cation; and the index x is a number from 1 to 10.

The terms compounds of formula (I) and compound of formula (I) as used herein have the same meaning and refer to a situation in which at least one compound of formula (I) is present. In general, terms mentioned in their plural form refer to a situation wherein only the singular term applies as well unless specifically expressed otherwise.

The organic moieties groups mentioned in the above definitions of the variables are—like the term halogen—collective terms for individual listings of the individual group members. The prefix $C_n$-$C_m$ indicates in each case the possible number of carbon atoms in the group.

The term "substituted with", e.g. as used in "partially, or fully substituted with" means that one or more, e.g. 1, 2, 3, 4 or 5 or all of the hydrogen atoms of a given radical have been replaced by one or more, same or different substituents. Accordingly, for substituted cyclic moieties, e.g. 1-cyanocyclopropyl, one or more of the hydrogen atoms of the cyclic moiety may be replaced by one or more, same or different substituents.

The term "$C_n$-$C_m$-alkyl" as used herein (and also in $C_n$-$C_m$-alkylamino, di-$C_n$-$C_m$-alkylamino, $C_n$-$C_m$-alkylaminocarbonyl, di-($C_n$-$C_m$-alkylamino)carbonyl) refers to a branched or unbranched saturated hydrocarbon group having n to m, e.g. 1 to 10 carbon atoms, preferably 1 to 6 carbon atoms, for example methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, octyl, 2-ethylhexyl, nonyl and decyl and their isomers. $C_1$-$C_4$-alkyl means for example methyl, ethyl, propyl, 1-methylethyl, butyl, 1-methylpropyl, 2-methylpropyl or 1,1-dimethylethyl.

The term "$C_2$-$C_m$-alkenyl" as used herein intends a branched or unbranched unsaturated hydrocarbon group having 2 to m, e.g. 2 to 10 or 2 to 6 carbon atoms and a double bond in any position, such as ethenyl, 1-propenyl, 2-propenyl, 1-methyl-ethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl and 1-ethyl-2-methyl-2-propenyl.

The term "$C_2$-$C_m$-alkynyl" as used herein refers to a branched or unbranched unsaturated hydrocarbon group having 2 to m, e.g. 2 to 10 or 2 to 6 carbon atoms and containing at least one triple bond, such as ethynyl, propynyl, 1-butynyl, 2-butynyl, and the like.

Similarly, "$C_n$-$C_m$-alkoxy" refers to straight-chain or branched alkyl groups having n to m carbon atoms, e.g. 1 to 10, in particular 1 to 6 or 1 to 4 carbon atoms (as mentioned above) bonded through oxygen at any bond in the alkyl group. Examples include $C_1$-$C_4$-alkoxy such as methoxy, ethoxy, propoxy, isopropoxy, butoxy, sec-butoxy, isobutoxy and tert-butoxy.

The term "hetaryl" or "aromatic heterocycle" or "aromatic heterocyclic ring" includes monocyclic 5- or 6-membered heteroaromatic radicals comprising as ring members 1, 2, 3 or 4 heteroatoms selected from N, O and S. Examples of 5- or 6-membered heteroaromatic radicals include pyridyl, i.e. 2-, 3-, or 4-pyridyl, pyrimidinyl, i.e. 2-, 4- or 5-pyrimidinyl, pyrazinyl, pyridazinyl, i.e. 3- or 4-pyridazinyl, thienyl, i.e. 2- or 3-thienyl, furyl, i.e. 2- or 3-furyl, pyrrolyl, i.e. 2- or 3-pyrrolyl, oxazolyl, i.e. 2-, 3- or 5-oxazolyl, isoxazolyl, i.e. 3-, 4- or 5-isoxazolyl, thiazolyl, i.e. 2-, 3- or 5-thiazolyl, isothiazolyl, i.e. 3-, 4- or 5-isothiazolyl, pyrazolyl, i.e. 1-, 3-, 4- or 5-pyrazolyl, i.e. 1-, 2-, 4- or 5-imidazolyl, oxadiazolyl, e.g. 2- or 5-[1,3,4]oxadiazolyl, 4- or 5-(1,2,3-oxadiazol)yl, 3- or 5-(1,2,4-oxadiazol)yl, 2- or 5-(1,3,4-thiadiazol)yl, thiadiazolyl, e.g. 2- or 5-(1,3,4-thiadiazol)yl, 4- or 5-(1,2,3-thiadiazol)yl, 3- or 5-(1,2,4-thiadiazol)yl, triazolyl, e.g. 1H-, 2H- or 3H-1,2,3-triazol-4-yl, 2H-triazol-3-yl, 1H-, 2H-, or 4H-1,2,4-triazolyl and tetrazolyl, i.e. 1H- or 2H-tetrazolyl.

The terms "heterocycle", "heterocyclyl" or "heterocyclic ring" includes, unless otherwise indicated, in general 5- or 6-membered, in particular 6-membered monocyclic heterocyclic radicals. The heterocyclic radicals may be saturated, partially unsaturated, or fully unsaturated. As used in this context, the term "fully unsaturated" also includes "aromatic". In a preferred embodiment, a fully unsaturated heterocycle is thus an aromatic heterocycle, preferably a 5- or 6-membered aromatic heterocycle comprising one or more, e.g. 1, 2, 3, or 4, preferably 1, 2, or 3 heteroatoms selected from N, O and S as ring members. Examples of aromatic heterocycles are provided above in connection with the definition of "hetaryl". Unless otherwise indicated, "hetaryls" are thus covered by the term "heterocycles". The heterocyclic non-aromatic radicals usually comprise 1, 2, 3, 4 or 5, preferably 1, 2 or 3 heteroatoms selected from N, O and S as ring members, where S-atoms as ring members may be present as S, SO or $SO_2$. Examples of 5- or 6-membered heterocyclic radicals comprise saturated or unsaturated, non-aromatic heterocyclic rings, such as oxiranyl, oxetanyl, thietanyl, thietanyl-S-oxid (S-oxothietanyl), thietanyl-S-dioxid (S-dioxothiethanyl), pyrrolidinyl, pyrrolinyl, pyrazolinyl, tetrahydrofuranyl, dihydrofuranyl, 1,3-dioxolanyl, thiolanyl, S-oxothiolanyl, S-dioxothiolanyl, dihydrothienyl, S-oxodihydrothienyl, S-dioxodihydrothienyl, oxazolidinyl, oxazolinyl, thiazolinyl, oxathiolanyl, piperidinyl, piperazinyl, pyranyl, dihydropyranyl, tetrahydropyranyl, 1,3- and 1,4-dioxanyl, thiopyranyl, S. oxothiopyranyl, S-dioxothiopyranyl, dihydrothiopyranyl, S-oxodihydrothiopyranyl, S-dioxodihydrothiopyranyl, tetrahydrothiopyranyl, Soxotetrahydrothiopyranyl, S-dioxotetrahydrothiopyranyl, morpholinyl, thiomorpholinyl, Soxothiomorpholinyl, S-dioxothiomorpholinyl, thiazinyl and the like. Examples for heterocyclic ring also comprising 1 or 2 carbonyl groups as ring members comprise pyrrolidin-2-onyl, pyrrolidin-2,5-dionyl, imidazolidin-2-onyl, oxazolidin-2-onyl, thiazolidin-2-onyl and the like.

The term "ammonium" per se refers to the cation $NH_4^+$. The expression "ammonium cations of primary, secondary or tertiary amines", as used similarly in the expression "primary, secondary, tertiary amines, and ammonium salts thereof" refers to protonated primary, secondary or tertiary amines. The protonation of such ammonium cations is dependent on the pH and the positive charge varies accordingly. The term "quaternary ammonium (cat)ion(s)" refers to permanently positively charged cations containing a nitrogen atom with four organic binding partners, e.g. alkyl groups. Accordingly, the term "quaternary ammonium salt(s)" refers to a salt containing a quaternary ammonium cation. Examples of quaternary ammonium ions are tetramethylammonium, tetraethylammonium, tetraethanolammonium, cholin, 2-hydroxyethyltrimethyl ammonium, and trishydroxyethylmethyl ammonium.

The term "PPO inhibitor" as used herein relates to protoporphyrinogen-IX oxidase inhibitors, or an agrochemically acceptable salt, stereoisomer, tautomer, or N-oxide thereof.

If the PPO-inhibitor is capable of forming geometrical isomers, for example E/Z isomers, it is possible to use both, the pure isomers and mixtures thereof, in the herbicidal composition according to the invention.

If the PPO-inhibitor has one or more centres of chirality and, as a consequence, are present as enantiomers or diastereomers, it is possible to use both, the pure enantiomers and diastereomers and their mixtures, in the herbicidal compositions according to the invention.

If the PPO-inhibitor has ionizable functional groups, it can also be employed in the form of its agriculturally acceptable salts. Suitable are, in general, the salts of those cations and the acid addition salts of those acids whose cations and anions, respectively, have no adverse effect on the activity of the active compounds.

Preferred cations are the ions of the alkali metals, preferably of lithium, sodium and potassium, of the alkaline earth metals, preferably of calcium and magnesium, and of the transition metals, preferably of manganese, copper, zinc and iron, further ammonium and substituted ammonium in which one to four hydrogen atoms are replaced by $C_1$-$C_4$-alkyl, hydroxy-$C_1$-$C_4$-alkyl, $C_1$-$C_4$-alkoxy-$C_1$-$C_4$-alkyl, hydroxy-$C_1$-$C_4$-alkoxy-$C_1$-$C_4$-alkyl, phenyl or benzyl, preferably ammonium, methylammonium, isopropylammonium, dimethylammonium, diethylammonium, diisopropylammonium, trimethylammonium, triethylammonium, tris(isopropyl)ammonium, heptylammonium, dodecylammonium, tetradecylammonium, tetramethylammonium, tetraethylammonium, tetrabutylammonium, 2-hydroxyethylammonium (olamine salt), 2-(2-hydroxyeth-1-oxy)eth-1-ylammonium (diglycolamine salt), di(2-hydroxyeth-1-yl)ammonium (diolamine salt), tris(2-hydroxyethyl)ammonium (trolamine salt), tris(2-hydroxypropyl)ammonium, benzyltrimethylammonium, benzyltriethylammonium, N,N,N-trimethylethanolammonium (choline salt), furthermore phosphonium ions, sulfonium ions, preferably tri($C_1$-$C_4$-alkyl)sulfonium, such as trimethylsulfonium, and sulfoxonium ions, preferably tri($C_1$-$C_4$-alkyl)sulfoxonium, and finally the salts of polybasic amines such as N,N-bis(3-aminopropyl)methylamine and diethylenetriamine.

Anions of useful acid addition salts are primarily chloride, bromide, fluoride, iodide, hydrogensulfate, methylsulfate, sulfate, dihydrogenphosphate, hydrogenphosphate, nitrate, bicarbonate, carbonate, hexafluorosilicate, hexafluorophosphate, benzoate and also the anions of $C_1$-$C_4$-alkanoic acids, preferably formate, acetate, propionate and butyrate.

PPO-inhibitors having a carboxyl group can be employed in the form of the acid, in the form of an agriculturally suitable salt as mentioned above or else in the form of an agriculturally acceptable derivative, for example as amides, such as mono- and di-$C_1$-$C_6$-alkylamides or arylamides, as esters, for example as allyl esters, propargyl esters, $C_1$-$C_{10}$-alkyl esters, alkoxyalkyl esters, tefuryl ((tetrahydrofuran-2-yl)methyl) esters and also as thioesters, for example as $C_1$-$C_{10}$-alkylthio esters. Preferred mono- and di-$C_1$-$C_6$-alkylamides are the methyl and the dimethylamides. Preferred arylamides are, for example, the anilides and the 2-chloroanilides. Preferred alkyl esters are, for example, the methyl, ethyl, propyl, isopropyl, butyl, isobutyl, pentyl, mexyl (1-methylhexyl), meptyl (1-methylheptyl), heptyl, octyl or isooctyl (2-ethylhexyl) esters. Preferred $C_1$-$C_4$-alkoxy-$C_1$-$C_4$-alkyl esters are the straight-chain or branched $C_1$-$C_4$-alkoxy ethyl esters, for example the 2-methoxyethyl, 2-ethoxyethyl, 2-butoxyethyl (butotyl), 2-butoxypropyl or 3-butoxypropyl ester. An example of a straight-chain or branched $C_1$-$C_{10}$-alkylthio ester is the ethylthio ester.

The term "ammonium" per se refers to the cation $NH_4^+$. The expression "ammonium cations of primary, secondary or tertiary amines", as used similarly in the expression "primary, secondary, tertiary amines, and ammonium salts thereof" refers to protonated primary, secondary or tertiary amines. The protonation of such ammonium cations is dependent on the pH and the positive charge varies accordingly. The term "quaternary ammonium (cat)ion(s)" refers to permanently positively charged cations containing a nitrogen atom with four organic binding partners, e.g. alkyl groups. Accordingly, the term "quaternary ammonium salt(s)" refers to a salt containing a quaternary ammonium cation. Examples of quaternary ammonium ions are tetramethylammonium, tetraethylammonium, tetraethanolammonium, cholin, 2-hydroxyethyltrimethyl ammonium, and trishydroxyethylmethyl ammonium.

The liquid herbicidal composition contains a compound of formula (I)

$$[R\text{-}(A)_x\text{-}OSO_3^-]\text{-}M^+ \qquad (I);$$

wherein

R is $C_{10}$-$C_{16}$-alkyl, $C_{10}$-$C_{16}$-alkenyl, or $C_{10}$-$C_{16}$-alkynyl;

each A is independently a group

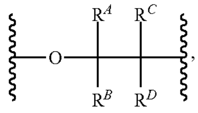

, wherein $R^A$, $R^B$, $R^C$, and $R^D$ are independently H, $CH_3$, or $CH_2CH_3$ with the proviso that the sum of C-atoms of $R^A$, $R^B$, $R^C$, and $R^D$ is up to 2;

$M^+$ is a monovalent cation; and the index x is a number from 1 to 10.

The variables of formula (I) have the following preferred meanings and embodiments. Combinations of such preferred meanings and embodiments of all levels of preference are within the scope of the invention.

R is a $C_{10}$-$C_{16}$-alkyl, $C_{10}$-$C_{16}$-alkenyl, or $C_{10}$-$C_{16}$-alkenyl. Typically, R is a $C_{10}$-$C_{16}$-alkyl, preferably $C_{10}$-$C_{14}$-alkyl, more preferably $C_{11}$-$C_{13}$-alkyl, and in particular $C_{12}$-alkyl. In another embodiment, R is $C_{10}$-$C_{16}$-alkenyl, preferably $C_{10}$-$C_{14}$-alkenyl, more preferably $C_{11}$-$C_{13}$-alkenyl, and in particular $C_{12}$-alkenyl. In another embodiment, R is $C_{10}$-$C_{16}$-alkynyl, preferably $C_{10}$-$C_{14}$-alkynyl, more preferably $C_{11}$-$C_{13}$-alkynyl, and in particular $C_{12}$-alkynyl.

Each A is independently a group

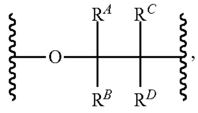

, wherein $R^A$, $R^B$, $R^C$, and $R^D$ are independently H, $CH_3$, or $CH_2CH_3$ with the proviso that the sum of C-atoms of $R^A$, $R^B$, $R^C$, and $R^D$ is up to 2.

Typically, the sum of C-atoms of $R^A$, $R^B$, $R^C$, and $R^D$ is up to 1. Preferably, $R^A$, $R^B$, $R^C$ and $R^D$ are H. Typically, each group A is the same, preferably wherein $R^A$, $R^B$, $R^C$ and $R^D$ are H.

In one embodiment, a mixture of different groups A is present, such as a mixture of groups A, wherein all substituents $R^A$, $R^B$, $R^C$ and $R^D$ are H, with groups A, wherein one substituent $R^A$, $R^B$, $R^C$ or $R^D$ is $CH_3$.

In another embodiment, a mixture of different groups A is present, such as a mixture of groups A, wherein all substituents $R^A$, $R^B$, $R^C$ and $R^D$ are H, with groups A, wherein one substituent $R^A$, $R^B$, $R^C$ or $R^D$ is $CH_2CH_3$.

In case a mixture of different groups A is present, the molar ratio of groups A, wherein all substituents $R^A$, $R^B$, $R^C$ and $R^D$ are H, is typically at least 10 mol %, preferably at least 25 mol %, more preferably at least 50 mol %, and in particular at least 80 mol %.

The index x is from 1 to 10. The index x represents a molar mean of all molecules of compounds of formula (I) in a given ensemble and is any number from 1 to 10, including real numbers between 1 and 10. The skilled person is aware that the common synthesis of compounds of formula (I) includes an alkoxylation step of alcohol R—OH, as outlined above, which alkoxylation step results in a statistical distribution of species $R\text{-}(A)_xOH$, and in turn results in a statistical distribution of compounds of formula (I) regarding the index x.

Typically, the index x is up to 8, preferably up to 6, more preferably up to 4, most preferably up to 3. The index x may be at least 1.5, preferably at least 2. The index x is typically from 1 to 5, preferably from 1 to 4, more preferably from 1 to 3, most preferably from 1.5 to 3, and in particular from 1.5 to 2.5.

The monovalent cation $M^+$ is typically selected from

α) alkali metal cations, e.g. Li+, $Na^+$, and $K^+$;

β) $NH_4^+$;

γ) ammonium cations of a primary, secondary, and tertiary amines; and

δ) quaternary ammonium cations, and mixtures thereof; wherein the molecular weight of the ammonium cations γ) or of the quaternary ammonium cation δ) is from 32 to 200 g/mol.

In one embodiment, the monovalent cation $M^+$ is selected from γ) ammonium cations of a primary, secondary, and tertiary amines; and 5) quaternary ammonium cations, and mixture thereof; wherein the molecular weight of the ammonium cations γ) or of the quaternary ammonium cation δ) is from 32 to 200 g/mol.

In another embodiment, the monovalent cation $M^+$ is selected from alkali metal cations. Suitable alkali metal cations are $Li^+$, $Na^+$, and $K^+$. In another embodiment, $M^+$ is $Na^+$. In another embodiment, $M^+$ is a mixture of alkali metal cations α) and ammonium cations γ) and/or quaternary ammonium cations δ). In another embodiment, the monovalent cation $M^+$ is $NH_4^+$.

The ammonium cation γ) or quaternary ammonium cation δ) typically has a molecular weight of from 32 to 200 g/mol. In one embodiment, the molecular weight of the ammonium cation γ) or quaternary ammonium cation δ) may be at least 35 g/mol. In another embodiment, the molecular weight of the ammonium cation γ) or quaternary ammonium cation δ) may be at least 40 g/mol. In another embodiment, the molecular weight of the ammonium cation γ) or quaternary ammonium cation δ) is at least 45 g/mol. In another embodiment, the molecular weight of the ammonium cation γ) or quaternary ammonium cation δ) is at least 50 g/mol. In another embodiment, the molecular weight of the ammonium cation γ) or quaternary ammonium cation δ) is at least 55 g/mol. In another embodiment, the molecular weight of the ammonium cation γ) or quaternary ammonium cation δ) is at least 60 g/mol. In another embodiment, the molecular weight of the ammonium cation γ) or quaternary ammonium cation $M^+$ is at least 61 g/mol. In one embodiment, the molecular weight of the ammonium cation γ) or quaternary ammonium cation δ) is up to 195 g/mol. In another embodiment, the molecular weight of the ammonium cation γ) or quaternary ammonium cation δ) is up to 190 g/mol g/mol. In another embodiment, the molecular weight of the ammonium cation γ) or quaternary ammonium cation δ) is up to 185 g/mol. In another embodiment, the molecular weight of the ammonium cation γ) or quaternary ammonium cation δ) is up to 180 g/mol. In another embodiment, the molecular weight of the ammonium cation γ) or quaternary ammonium cation δ) is up to 175 g/mol. In another embodiment, the molecular weight of the ammonium cation γ) or quaternary ammonium cation δ) is up to 170 g/mol. In another embodiment, the molecular weight of the ammonium cation γ) or quaternary ammonium cation δ) is up to 160 g/mol. In another embodiment, the molecular weight of the ammonium cation γ) or quaternary ammonium cation δ) is up to 150 g/mol. In another embodiment, the molecular weight of the ammonium cation γ) or quaternary ammonium cation δ) is up to 140 g/mol. In another embodiment, the molecular weight of the ammonium cation γ) or quaternary ammonium cation δ) is up to 130 g/mol. In another embodiment, the molecular weight of the ammonium cation γ) or quaternary ammonium cation δ) is up to 120 g/mol. In another embodiment, the molecular weight of the ammonium cation γ) or quaternary ammonium cation δ) is up to 110 g/mol. In another embodiment, the molecular weight of the ammonium cation γ) or quaternary ammonium cation δ) is up to 105 g/mol. In one embodiment, the molecular weight of the ammonium cation γ) or quaternary ammonium cation δ) is from 35 g/mol to 190 g/mol. In another embodiment, the molecular weight of the ammonium cation γ) or quaternary ammonium cation $M^+$ is from 55 g/mol to 180 g/mol. In another embodiment, the molecular weight of the ammonium cation γ) or quaternary ammonium cation δ) is from 40 g/mol to 140 g/mol. In another embodiment, the molecular weight of the ammonium cation γ) or quaternary ammonium cation $M^+$ is from 50 g/mol to 120 g/mol. In one embodiment, the molecular weight of the ammonium cation γ) or quaternary ammonium cation δ) is from 55 g/mol to 110 g/mol. In one embodiment, the molecular weight of the ammonium cation γ) or quaternary ammonium cation δ) is from 60 g/mol to 110 g/mol.

The ammonium cations of primary, secondary, and tertiary amines γ) and the quaternary ammonium cations δ) are typically of formula (III)

(III)

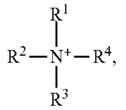

wherein $R^1$, $R^2$, $R^3$, and $R^4$ are independently H, or $C_1$-$C_{10}$-alkyl, which is unsubstituted or substituted with OH, $C_1$-$C_{10}$-alkoxy, or hydroxy-$C_1$-$C_{10}$-alkoxy; or two of the substituents $R^1$, $R^2$, $R^3$, and $R^4$ form, together with the N-atom to which they are bound, a 5-, or 6-membered, saturated, partially- or fully unsaturated heterocycle containing additionally none, one or two atoms O, or S, and wherein said S-atom(s) are independently oxidized or non-oxidized, with the proviso that at least one substituent $R^1$, $R^2$, $R^3$, or $R^4$ is not H.

Accordingly, ammonium cations of primary, secondary or tertiary amines γ) are typically selected from protonated amines of formula (IV)

(IV)

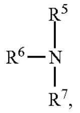

wherein $R^5$, $R^6$, and $R^7$ are independently H, or $C_1$-$C_{10}$-alkyl, which is unsubstituted or substituted with OH, $C_1$-$C_{10}$-alkoxy, or hydroxy-$C_1$-$C_{10}$-alkoxy; or two of the substituents $R^5$, $R^6$, and $R^7$ form, together with the N-atom to which they are bound, a 5-, or 6-membered, saturated, partially- or fully unsaturated heterocycle containing additionally none, one or two atoms O, or S, and wherein said S-atom(s) are independently oxidized or non-oxidized, with the proviso that at least one substituent $R^5$, $R^6$, or $R^7$ is not H.

The sum of substituents $R^1$, $R^2$, $R^3$, and $R^4$ typically contain up to 18 carbon atoms ("C-atoms"), preferably up to 16 C-atoms, more preferably up to 14 C-atoms, most preferably up to 12 C-atoms, utmost preferably up to 10 C-Atom, in particular up to 8 C-atoms, such as up to 6 C-atoms.

In one embodiment, the sum of substituents $R^1$, $R^2$, $R^3$ and $R^4$ contain up to 9 C-atoms. In another embodiment, the sum of substituents $R^1$, $R^2$, $R^3$ and $R^4$ contain up to 7 C-atoms. In another embodiment, the sum of substituents $R^1$, $R^2$, $R^3$ and $R^4$ contain up to 5 C-atoms. In another embodiment, the sum of substituents $R^1$, $R^2$, $R^3$ and $R^4$ contain up to 4 C-atoms. In another embodiment, the sum of substituents $R^1$, $R^2$ and $R^3$ contain up to 3 C-atoms.

The sum of substituents $R^1$, $R^2$ and $R^3$ contain at least one C-atom, preferably at least 2 C-atoms, more preferably at least 3 C-atoms.

In one embodiment, the sum of substituents $R^1$, $R^2$, $R^3$ and $R^4$ contain from 1 to 15 C-atoms. In another embodiment, the sum of substituents $R^1$, $R^2$, $R^3$ and $R^4$ contain from 1 to 12 C-atoms. In another embodiment, the sum of substituents $R^1$, $R^2$, $R^3$ and $R^4$ contain from 1 to 10 C-atoms. In another embodiment, the substituents $R^1$, $R^2$, $R^3$, and $R^4$ contain from 2 to 12 C-atoms. In another embodiment, the sum of substituents $R^1$, $R^2$, $R^3$ and $R^4$ contain from 2 to 10 C-atoms. In another embodiment, the sum of substituents $R^1$, $R^2$, $R^3$ and $R^4$ contain from 1 to 6 C-atoms. In another embodiment, the substituents $R^1$, $R^2$, $R^3$ and $R^4$ contain from 1 to 4 C-atoms. In another embodiment, the substituents $R^1$, $R^2$, $R^3$ and $R^4$ contain from 1 to 3 C-atoms.

The sum of substituents $R^5$, $R^6$, and $R^7$ typically contain up to 18 carbon atoms ("C-atoms"), preferably up to 16 C-atoms, more preferably up to 14 C-atoms, most preferably up to 12 C-atoms, utmost preferably up to 10 C-Atom, in particular up to 8 C-atoms, such as up to 6 C-atoms.

In one embodiment, the sum of substituents $R^5$, $R^6$, and $R^7$ contain up to 9 C-atoms. In another embodiment, the sum of substituents $R^5$, $R^6$, and $R^7$ contain up to 7 C-atoms. In another embodiment, the sum of substituents $R^5$, $R^6$, and $R^7$ contain up to 5 C-atoms. In another embodiment, the sum of substituents $R^5$, $R^6$, and $R^7$ contain up to 4 C-atoms. In another embodiment, the sum of substituents $R^5$, $R^6$ and $R^7$ contain up to 3 C-atoms.

The sum of substituents $R^5$, $R^6$ and $R^7$ contain at least one C-atom, preferably at least 2 C-atoms, more preferably at least 3 C-atoms.

In one embodiment, the sum of substituents $R^5$, $R^6$, and $R^7$ contain from 1 to 15 C-atoms. In another embodiment, the sum of substituents $R^5$, $R^6$, and $R^7$ contain from 1 to 12 C-atoms. In another embodiment, the sum of substituents $R^5$, $R^6$, and $R^7$ contain from 1 to 10 C-atoms. In another embodiment, the substituents $R^5$, $R^6$, and $R^7$ contain from 2 to 12 C-atoms. In another embodiment, the sum of substituents $R^5$, $R^6$, and $R^7$ contain from 2 to 10 C-atoms. In another embodiment, the sum of substituents $R^5$, $R^6$, and $R^7$ contain from 1 to 6 C-atoms. In another embodiment, the substituents $R^5$, $R^6$, and $R^7$ contain from 1 to 4 C-atoms. In another embodiment, the substituents $R^5$, $R^6$, and $R^7$ contain from 1 to 3 C-atoms.

In one embodiment $R^1$, $R^2$, $R^4$, $R^5$, $R^6$, and $R^7$ are independently H, or $C_1$-$C_{10}$-alkyl, which is unsubstituted or substituted with OH, $C_1$-$C_{10}$-alkoxy, or hydroxy-$C_1$-$C_{10}$-alkoxy, wherein at least one substituent $R^1$, $R^2$, $R^3$, or $R^4$ is not H, and wherein at least one substituent $R^5$, $R^6$, or $R^7$ is not H.

In another embodiment $R^1$, $R^2$, $R^4$, $R^5$, $R^6$, and $R^7$ are independently H, or $C_1$-$C_3$-alkyl, which is unsubstituted or substituted with OH, $C_1$-$C_3$-alkoxy, or hydroxy-$C_1$-$C_3$-alkoxy, wherein at least one substituent $R^1$, $R^2$, $R^3$, or $R^4$ is not H, and wherein at least one substituent $R^5$, $R^6$, or $R^7$ is not H.

In another embodiment $R^1$, $R^2$, $R^4$, $R^5$, $R^6$, and $R^7$ are independently H, or $C_1$-$C_7$-alkyl, which is unsubstituted or substituted with OH, $C_1$-$C_4$-alkoxy, or hydroxy-$C_1$-$C_4$-alkoxy, wherein at least one substituent $R^1$, $R^2$, $R^3$, or $R^4$ is not H, and wherein at least one substituent $R^5$, $R^6$, or $R^7$ is not H.

In another embodiment $R^1$, $R^2$, $R^4$, $R^5$, $R^6$, and $R^7$ are independently H, or $C_1$-$C_3$-alkyl, which is unsubstituted or substituted with OH, $C_1$-$C_3$-alkoxy, or hydroxy-$C_1$-$C_3$-alkoxy, wherein at least one substituent $R^1$, $R^2$, $R^3$, or $R^4$ is not H, and wherein at least one substituent $R^5$, $R^6$, or $R^7$ is not H.

In another embodiment $R^1$, $R^2$, $R^4$, $R^5$, $R^6$, and $R^7$ are independently H, or $C_1$-$C_2$-alkyl, which is unsubstituted or substituted with OH, $C_1$-$C_2$-alkoxy, or hydroxy-$C_1$-$C_2$-alkoxy, wherein at least one substituent $R^1$, $R^2$, $R^3$, or $R^4$ is not H, and wherein at least one substituent $R^5$, $R^6$, or $R^7$ is not H.

In another embodiment, two of the substituents $R^1$, $R^2$, $R^3$ and $R^4$, or of the substituents $R^5$, $R^6$, and $R^7$ form, together with the N-atom to which they are bound, a 5-, or 6-membered, saturated, partially- or fully unsaturated heterocycle containing additionally none, one or two atoms O, or S, and wherein said S-atom(s) are independently oxidized or non-oxidized, and the remaining substituents are either H, or $C_1$-$C_{10}$-alkyl, which is unsubstituted or substituted with OH, $C_1$-$C_{10}$-alkoxy, or hydroxy-$C_1$-$C_{10}$-alkoxy.

In another embodiment, two of the substituents $R^1$, $R^2$, $R^3$ and $R^4$, or of the substituents $R^5$, $R^6$, and $R^7$ form, together with the N-atom to which they are bound, a 5-, or 6-membered, saturated, partially- or fully unsaturated heterocycle containing additionally none, one or two atoms O, or S, and wherein said S-atom(s) are independently oxidized or non-oxidized, and the remaining substituents are either H, or $C_1$-$C_4$-alkyl, which is unsubstituted or substituted with OH, $C_1$-$C_4$-alkoxy, or hydroxy-$C_1$-$C_4$-alkoxy.

In another embodiment, two of the substituents $R^1$, $R^2$, $R^3$ and $R^4$, or of the substituents $R^5$, $R^6$, and $R^7$ form, together with the N-atom to which they are bound, a 5-, or 6-membered, saturated, partially- or fully unsaturated heterocycle containing additionally none, one or two atoms O, or S, and wherein said S-atom(s) are independently oxidized or non-oxidized, and the remaining substituents are either H, or $C_1$-$C_3$-alkyl, which is unsubstituted or substituted with OH, $C_1$-$C_3$-alkoxy, or hydroxy-$C_1$-$C_3$-alkoxy.

In another embodiment, two of the substituents $R^1$, $R^2$, $R^3$ and $R^4$, or of the substituents $R^5$, $R^6$, and $R^7$ form, together with the N-atom to which they are bound, a 5-, or 6-membered, saturated, partially- or fully unsaturated heterocycle containing additionally none, one or two atoms O, or S, and wherein said S-atom(s) are independently oxidized or non-oxidized, and the remaining substituents are either H, or $C_1$-$C_2$-alkyl, which is unsubstituted or substituted with OH, $C_1$-$C_2$-alkoxy, or hydroxy-$C_1$-$C_2$-alkoxy.

The primary, secondary, or tertiary amine as referred to herein is typically selected from ethanolamine (also called monoethanolamine; CAS 141-43-5), diethanolamine, diglycolamine, 1-aminopropan-2-ol, 2-dimethylaminoethanol, 2-(butylamino)ethanol, 2-diethylaminoethanol, 2-(tert-butylamino)ethanol, N-(tert-butyl)diethanolamine, triethanolamine, 2-ethylaminoethanol, 2-aminoheptane, triisopropylamine, N-(2-hydroxyethyl)morpholin, N-methylmorpholine, N-butyldiethanolamin, 2-(dibutylamino)ethanol.

Accordingly, an ammonium cation of a primary, secondary, or tertiary amine may be a protonated amine selected from those above.

Examples of quaternary ammonium cations as referred to herein—e.g. as monovalent cations $M^+$ or as contained in the quaternary ammonium salts—are 2-hydroxyethyltrimethyl ammonium, and trishydroxyethylmethyl ammonium.

Accordingly, the monovalent cation $M^+$ is preferably a protonated amine selected from ethanolamine, diethanolamine, diglycolamine, 1-aminopropan-2-ol, 2-dimethylaminoethanol, 2-(butylamino)ethanol, 2-diethylaminoethanol, 2-(tert-butylamino)ethanol, N-(tertbutyl) diethanolamine, triethanolamine, 2-ethylaminoethanol, 2-aminoheptan, triisopropylamine, N-(2-hydroxyethyl)morpholin, N-methylmorpholine, N-butyldiethanolamin, 2-(dibutylamino)ethanol, or a quaternary ammonium cation selected from 2-hydroxyethyltrimethyl ammonium, trishydroxyethylmethyl ammonium and mixtures thereof.

In one embodiment, the monovalent cation $M^+$ is protonated ethanolamine (ethanolammonium). In another embodiment, the monovalent cation $M^+$ is protonated diethanolamine (diethanolammonium). In another embodiment, the monovalent cation $M^+$ is protonated diglycolamine (diglycolammonium). In another embodiment, the monovalent cation $M^+$ is protonated 1-aminopropan-2-ol. In another embodiment, the monovalent cation $M^+$ is protonated 2-dimethylaminoethanol. In another embodiment, the monovalent cation $M^+$ is protonated 2-(butylamino)ethanol. In another embodiment, the monovalent cation $M^+$ is protonated 2-diethylaminoethanol. In another embodiment, the monovalent cation $M^+$ is protonated 2-(tert-butylamino) ethanol. In another embodiment, the monovalent cation $M^+$ is protonated N-(tert-butyl)diethanolamine (N-(tert-butyl) diethanolammonium). In another embodiment, the monovalent cation $M^+$ is protonated triethanolamine (triethanolammonium). In another embodiment, the monovalent cation $M^+$ is protonated 2-ethylaminoethanol. In another embodiment, the monovalent cation $M^+$ is protonated 2-aminoheptan. In another embodiment, the monovalent cation $M^+$ is triisopropylamine (triisopropylammonium). In another embodiment, the monovalent cation $M^+$ is N-(2-hydroxyethyl)morpholin, In another embodiment, the monovalent cation $M^+$ is protonated N-methylmorpholine. In another embodiment, the monovalent cation $M^+$ is protonated N-butyldiethanolamine (N-butyldiethanolammonium). In another embodiment, the monovalent cation $M^+$ is protonated 2-(dibutylamino)ethanol. In another embodiment, the monovalent cation $M^+$ is protonated 2-hydroxyethyltrimethyl ammonium. In another embodiment, the monovalent cation $M^+$ is protonated trishydroxyethylmethyl ammonium.

In another embodiment, the ammonium cation $M^+$ is a protonated amine selected from triethanolamine, 2-ethylaminoethanol, 2-aminoheptane, triisopropylamine, N-(2-hydroxyethyl)morpholin, N-methylmorpholine, N-butyldiethanolamin, 2-(dibutylamino)ethanol, or a mixture thereof.

Accordingly, in one embodiment, the substituents of formula (I) have the following meaning:

R is $C_{10}$-$C_{14}$-alkyl;

each A is independently a group

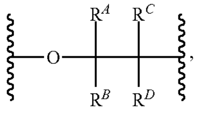

wherein $R^A$, $R^B$, $R^C$, and $R^D$ are independently H, $CH_3$, or $CH_2CH_3$ with the proviso that the sum of C-atoms of $R^A$, $R^B$, $R^C$, and $R^D$ is up to 2;

the index x is a number from 1 to 5; and $M^+$ is a monovalent cation.

In another embodiment, the substituents of formula (I) have the following meaning:

R is $C_{10}$-$C_{14}$-alkyl;

each A is independently a group

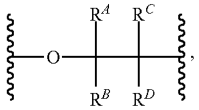

wherein J $R^A$, $R^B$, $R^C$, and $R^D$ are H;

$M^+$ is a monovalent cation; and the index x is a number from 1 to 5.

In another embodiment, the substituents of formula (I) have the following meaning:

R is $C_{10}$-$C_{14}$-alkyl;

each A is independently a group

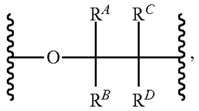

wherein $R^A$, $R^B$, $R^C$, and $R^D$ are H;

$M^+$ is an alkali metal cation or $NH_4^+$; and the index x is a number from 1 to 5.

In another embodiment, the substituents of formula (I) have the following meaning:

R is $C_{10}$-$C_{14}$-alkyl;

each A is independently a group

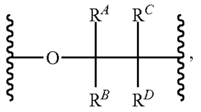

wherein $R^A$, $R^B$, $R^C$, and $R^D$ are H;

$M^+$ is an Na*; and the index x is a number from 1 to 5.

In another embodiment, the substituents of formula (I) have the following meaning:

R is $C_{10}$-$C_{14}$-alkyl;

each A is independently a group

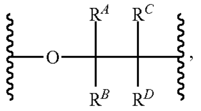

wherein $R^A$, $R^B$, $R^C$, and $R^D$ are H;

$M^+$ is a monovalent cation selected from γ) ammonium cations of a primary, secondary, and tertiary amines; and δ) quaternary ammonium cations, and mixtures thereof; wherein the molecular weight of the ammonium cations γ) or of the quaternary ammonium cation δ) is from 32 to 200 g/mol; and the index x is a number from 1 to 5.

In another embodiment, the substituents of formula (I) have the following meaning:

R is $C_{10}$-$C_{14}$-alkyl;

each A is independently a group

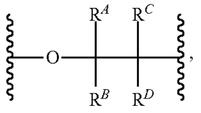

wherein $R^A$, $R^B$, $R^C$, and $R^D$ are H;

$M^+$ is γ) a protonated amine selected from ethanolamine, diethanolamine, diglycolamine, 1-aminopropan-2-ol, 2-dimethylaminoethanol, 2-(butylamino)ethanol, 2-diethylaminoethanol, 2-(tert-butylamino)ethanol, N-(tert-butyl)diethanolamine, triethanolamine, 2-ethylaminoethanol, 2-aminoheptan, triisopropylamine, N-(2-hydroxyethyl)morpholin, N-methylmorpholine, N-butyldiethanolamin, 2-(dibutylamino)ethanol, or 5) a quaternary ammonium cation selected from 2-hydroxyethyltrimethyl ammonium, trishydroxyethylmethyl ammonium, or mixtures thereof; and the index x is a number from 1 to 5.

In another embodiment, the substituents of formula (I) have the following meaning:

R is $C_{10}$-$C_{14}$-alkyl;

each A is independently a group

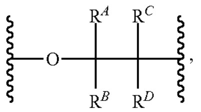

wherein $R^A$, $R^B$, $R^C$, and $R^D$ are H;

$M^+$ is a protonated amine selected from diethanolamine, 1-aminopropan-2-ol, and mixtures thereof; and the index x is a number from 1 to 5.

Compounds of formula (I) can be prepared by standard methods of organic chemistry. The anionic moiety (I-a)

$$R\text{-}(A)_x\text{-}OSO_3^- \quad \text{(I-a)}$$

is commercially available in the form of sodium or potassium salts, e.g. under the tradename Genapol LRO from Clariant, and can be prepared as described in U.S. Ser. No. 10/091,994B2, columns 1-2, which is incorporated herein by reference. Compounds of formula (I) are ionic compounds that comprise the anionic moiety (I-a) and the monovalent cation $M^+$, which is positively and singly charged.

The compounds of formula (I) may contain an ammonium cation $M^+$ of a primary, secondary, or tertiary amine, i.e. a protonated primary, secondary or tertiary amine, or a quaternary ammonium cation. Such compounds are available from the commercially available sodium or potassium salts by ion exchange chromatography or other methods suitable for ion exchange. Alternatively, compounds of formula (I), wherein $M^+$ is $NH_4^+$ or an ammonium cation of a primary, secondary, or tertiary amine, are available by reaction of compounds of formula (1) with $SO_3$ or $ClSO_3H$ and subsequent addition of the respective amine base or ammonia M as depicted in Scheme 1

Scheme 1

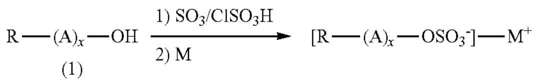

wherein all variables have a meaning as defined for formula (I). Reactions of this type are typically carried out at temperatures of 50 to 100° C. under addition of an excess of $SO_3$ or $ClSO_3H$ compared to the amount of compound of formula (I). Compounds of formula (I) are commercially available under various tradenames, e.g. the Lutensol TO series from BASF, and may be produced from the respective alcohols R—OH by alkoxylation with ethylene oxide, propylene oxide, or butylene oxide as described in U.S. Ser. No. 10/091,994B2. Amine bases M are equally commercially available and form the respective ammonium cations $M^+$ of primary, secondary, or tertiary amines in compounds of formula (I).

Compounds of formula (I-c) falling under the definition of compounds of formula (I), wherein $M^+$ is an ammonium cation γ) or a quaternary ammonium cation δ) (which cations are hereinafter collectively referred to as $Q^+$) may also form in situ in a given composition from a salt of the anionic moiety (I-a) with any given cation $N^+$ as displayed formula (I-b) in the presence of the monovalent cation $Q^+$ with any given anion $B^-$ as displayed in Scheme 2 Scheme 2:

Scheme 2

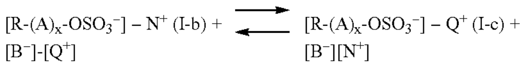

wherein $N^+$ represents any given monovalent cation different from $Q^+$, (such as $Na^+$ or $K^+$), wherein $B^-$ represents any anion different from anion (I-a), such as $Cl^-$, and wherein all other variables have a meaning as defined for formula (I). Ion exchange reactions of this type usually occur in liquid compositions and reach an equilibrium in which both the reaction yielding compounds of formula (I-c) and the backward reaction to compounds of formula (I-b) are in equilibrium.

Compounds of formula (I), wherein $M^+$ is an ammonium cation γ) may also form in situ in a given composition from the free acid compounds of formula (I-d) and the respective amine M as displayed in Scheme 3

Scheme 3

$$[R\text{-}(A)_x\text{-}OSO_3H\ (I\text{-}d) + M \rightleftharpoons [R\text{-}(A)_x\text{-}OSO_3^-] - M^+\ (I),$$

wherein M is a primary, secondary, or tertiary amine as described herein, and all variables have a meaning as defined for formula (I). This acid-base reaction may be carried out before the addition of compound of formula (I) to the agrochemical composition, or it may occur in situ by adding compounds of formula (I-d) and the amine compound M separately.

Since the reactions displayed in Schemes 2 and 3 are in equilibrium, it will be appreciated that the invention thus also pertains to a situation wherein the compound of formula (I-b) and the compounds of formula (I-c) and/or the compounds of formula (I-d) are present at the same time in various molar ratios. For example, the agrochemical composition may contain compounds of formula (I-b) in a molar ratio of 1:50 to 1:1 compared with the total molarity of compounds containing the moiety (I-a) in the herbicidal composition, preferably in a molar ratio of 1:20 to 1:1, more preferably from 1:10 to 1:1.

The herbicidal composition may comprise the compound of formula (I) in a concentration of at least 1 wt %, preferably at least 5 wt % more preferably at least 10 wt %, most preferably at least 15 wt %, in particular at least 20 wt %, and especially at least 30 wt %, such as at least 40 wt % based on the total weight of the herbicidal composition. The herbicidal composition may comprise the compound of formula (I) in a concentration of up to 90 wt %, preferably up to 70 wt %, more preferably up to 50 wt % based on the total weight of the herbicidal composition. The herbicidal composition may comprise the compound of formula (I) in a concentration of from 5 to 70 wt %, preferably 5 to 60 wt %, more preferably 10 to 50 wt %, most preferably 15 to 40 wt % based on the total weight of the herbicidal composition.

The herbicidal composition contains at least one inhibitor of protoporphyrinogen-IX-oxidase (PPO inhibitor; PPO). The herbicidal activity of these compounds is based on the inhibition of the protoporphyrinogen-IX-oxidase. These inhibitors belong to the group E of the HRAC classification system.

The herbicidal composition comprises a PPO-inhibitor preferably in a herbicidally effective amount. The term “effective amount” denotes an amount of the herbicidal composition or of the PPO-inhibitor contained therein, which is sufficient to achieve a biological effect, such as controlling harmful fungi on cultivated plants or in the protection of materials and which does not result in a substantial damage to the treated plants. Such an amount can vary in a broad range and is dependent on various factors, such as the type of vegetation to be controlled, the treated cultivated plant or material, the climatic conditions and the specific agrochemical active ingredient used.

The herbicidal composition may comprise the PPO-inhibitor in a concentration of at least 1 wt %, preferably at least 5 wt % more preferably at least 10 wt %, most preferably at least 25 wt %, and in particular at least 30 wt % based on the total weight of the herbicidal composition. The agrochemical composition may comprise the PPO-inhibitor in a concentration of up to 90 wt %, preferably up to 70 wt %, more preferably up to 50 wt %, most preferably up to 25 wt % based on the total weight of the herbicidal composition. The herbicidal composition may comprise the PPO-inhibitor in a concentration of from 1 to 70 wt %, preferably 1 to 60 wt %, more preferably 5 to 50 wt % based on the total weight of the herbicidal composition.

The molar ratio of the PPO-inhibitor to compounds of formula (I) is typically from 100:1 to 1:100, preferably from 50:1 to 1:50, more preferably from 10:1 to 1:10, most preferably from 5:1 to 1:5. The molar ratio of the PPO-inhibitor to the compound of formula (I) may be from 100:1 to 1:100, preferably 50:1 to 1:50, more preferably 5:1 to 1:20.

The PPO-inhibitor is typically either present in dissolved or in suspended form in the herbicidal composition. If the herbicidal composition is an aqueous composition, the PPO-inhibitor is typically dissolved, such as in soluble concentrates. If the herbicidal composition is an oily composition, the PPO-inhibitor is typically present in particulate form as suspended particles, in particular in oil dispersions.

Examples of PPO-inhibitors are acifluorfen, acifluorfen-sodium, azafenidin, bencarbazone, benzfendizone, bifenox, butafenacil, carfentrazone, carfentrazone-ethyl, chlomethoxyfen, chlorphthalim, cinidon-ethyl, cyclopyranil, fluazolate, flufenpyr, flufenpyr-ethyl, flumiclorac, flumiclorac-pentyl, flumioxazin, fluoroglycofen, fluoroglycofen-ethyl, fluthiacet, fluthiacet-methyl, fomesafen, halosafen, lactofen, oxadiargyl, oxadiazon, oxyfluorfen, pentoxazone, profluazol, pyraclonil, pyraflufen, pyraflufen-ethyl, saflufenacil, sulfentrazone, thidiazimin, tiafenacil, trifludimoxazin, ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (CAS 353292-31-6; S-3100), N-ethyl-3-(2,6-dichloro-4-trifluoromethylphenoxy)-5-methyl-1H-pyrazole-1-carboxamide (CAS 452098-92-9), N-tetrahydrofurfuryl-3-(2,6-dichloro-4-trifluoromethylphenoxy)-5-methyl-1H-pyrazole-1-carboxamide (CAS 915396-43-9), N-ethyl-3-(2-chloro-6-fluoro-4-trifluoromethylphenoxy)-5-methyl-1H-pyrazole-1-carboxamide (CAS 452099-05-7), N-tetrahydrofurfuryl-3-(2-chloro-6-fluoro-4-trifluoromethylphenoxy)-5-methyl-1H-pyrazole-1-carboxamide (CAS 452100-03-7), 3-[7-fluoro-3-oxo-4-(prop-2-ynyl)-3,4-dihydro-2H-benzo[1,4]oxazin-6-yl]-1,5-dimethyl-6-thioxo-[1,3,5]triazinan-2,4-dione (CAS 451484-50-7), 2-(2,2,7-trifluoro-3-oxo-4-prop-2-ynyl-3,4-dihydro-2H-benzo[1,4]oxazin-6-yl)-4,5,6,7-tetrahydro-isoindole-1,3-dione (CAS 1300118-96-0), 1-methyl-6-trifluoromethyl-3-(2,2,7-trifluoro-3-oxo-4-prop-2-ynyl-3,4-dihydro-2H-benzo[1,4]oxazin-6-yl)-1H-pyrimidine-2,4-dione (CAS 1304113-05-0), methyl (E)-4-[2-chloro-5-[4-chloro-5-(difluoromethoxy)-1H-methyl-pyrazol-3-yl]-4-fluoro-phenoxy]-3-methoxy-but-2-enoate (CAS 948893-00-3), and 3-[7-chloro-5-fluoro-2-(trifluoromethyl)-1H-benzimidazol-4-yl]-1-methyl-6-(trifluoromethyl)-1H-pyrimidine-2,4-dione (CAS 212754-02-4), 2-[2-chloro-5-[3-chloro-5-(trifluoromethyl)-2-pyridinyl]-4-fluorophenoxy]-2-methoxy-acetic acid methyl ester (CAS 1970221-16-9), 2-[2-[[3-chloro-6-[3,6-dihydro-3-methyl-2,6-dioxo-4-(trifluoromethyl)-1

(2H)-pyrimidinyl]-5-fluoro-2-pyridinyl]oxy]phenoxy]-acetic acid methyl ester (CAS 2158274-96-3), 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy] acetic acid ethyl ester (CAS 2158274-50-9), methyl 2-[[3-[2-chloro-5-[4-(difluoromethyl)-3-methyl-5-oxo-1,2,4-triazol-1-yl]-4-fluorophenoxy]-2-pyridyl]oxy]acetate (CAS 2271389-22-9), ethyl 2-[[3-[2-chloro-5-[4-(difluoromethyl)-3-methyl-5-oxo-1,2,4-triazol-1-yl]-4-fluoro-phenoxy]-2-pyridyl]oxy]acetate (CAS 2230679-62-4), 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy]-acetic acid methyl ester (CAS 2158275-73-9), 2-[[3-[[3-chloro-6-[3,6-dihydro-3-methyl-2,6-dioxo-4-(trifluoromethyl)-1(2H)pyrimidinyl]-5-fluoro-2-pyridinyl]oxy]-2-pyridinyl]oxy] acetic acid ethyl ester (CAS 2158274-56-5), 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy]-N-(methylsulfonyl)-acetamide (CAS 2158274-53-2), and 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy]-N-(methylsulfonyl)-acetamide (CAS 2158276-22-1).

In one embodiment, the PPO-inhibitor is acifluorfen. In another embodiment, the PPO-inhibitor is acifluorfen-sodium. In another embodiment, the PPO-inhibitor is azafenidin. In another embodiment, the PPO-inhibitor is bencarbazone. In another embodiment, the PPO-inhibitor is benzfendizone. In another embodiment, the PPO-inhibitor is bifenox. In another embodiment, the PPO-inhibitor is butafenacil. In another embodiment, the PPO-inhibitor is carfentrazone. In another embodiment, the PPO-inhibitor is carfentrazone-ethyl. In another embodiment, the PPO-inhibitor is chlomethoxyfen. In another embodiment, the PPO-inhibitor is chlorphthalim. In another embodiment, the PPO-inhibitor is cinidon-ethyl. In another embodiment, the PPO-inhibitor is cyclopyranil. In another embodiment, the PPO-inhibitor is fluazolate. In another embodiment, the PPO-inhibitor is flufenpyr. In another embodiment, the PPO-inhibitor is flufenpyr-ethyl. In another embodiment, the PPO-inhibitor is flumiclorac. In another embodiment, the PPO-inhibitor is flumiclorac-pentyl. In another embodiment, the PPO-inhibitor is flumioxazin. In another embodiment, the PPO-inhibitor is fluoroglycofen. In another embodiment, the PPO-inhibitor is fluoroglycofen-ethyl. In another embodiment, the PPO-inhibitor is fluthiacet. In another embodiment, the PPO-inhibitor is fluthiacet-methyl. In another embodiment, the PPO-inhibitor is fomesafen. In another embodiment, the PPO-inhibitor is halosafen. In another embodiment, the PPO-inhibitor is lactofen. In another embodiment, the PPO-inhibitor is oxadiargyl. In another embodiment, the PPO-inhibitor is oxadiazon. In another embodiment, the PPO-inhibitor is oxyfluorfen. In another embodiment, the PPO-inhibitor is pentoxazone. In another embodiment, the PPO-inhibitor is profluazol. In another embodiment, the PPO-inhibitor is pyraclonil. In another embodiment, the PPO-inhibitor is pyraflufen. In another embodiment, the PPO-inhibitor is pyraflufen-ethyl. In another embodiment, the PPO-inhibitor is saflufenacil. In another embodiment, the PPO-inhibitor is sulfentrazone. In another embodiment, the PPO-inhibitor is thidiazimin. In another embodiment, the PPO-inhibitor is tiafenacil. In another embodiment, the PPO-inhibitor is trifludimoxazin. In another embodiment, the PPO-inhibitor is ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate. In another embodiment, the PPO-inhibitor is N-ethyl-3-(2,6-dichloro-4-trifluoromethylphenoxy)-5-methyl-1H-pyrazole-1-carboxamide. In another embodiment, the PPO-inhibitor is N-tetrahydrofurfuryl-3-(2,6-dichloro-4-trifluoromethylphenoxy)-5-methyl-1H-pyrazole-1-carboxamide. In another embodiment, the PPO-inhibitor is N-ethyl-3-(2-chloro-6-fluoro-4-trifluoromethylphenoxy)-5-methyl-1H-pyrazole-1-carboxamide. In another embodiment, the PPO-inhibitor is N-tetrahydrofurfuryl-3-(2-chloro-6-fluoro-4-trifluoromethylphenoxy)-5-methyl-1H-pyrazole-1-carboxamide. In another embodiment, the PPO-inhibitor is 3-[7-fluoro-3-oxo-4-(prop-2-ynyl)-3,4-dihydro-2H-benzo[1,4]oxazin-6-yl]-1,5-dimethyl-6-thioxo-[1,3,5]triazinan-2,4-dione. In another embodiment, the PPO-inhibitor is 2-(2,2,7-trifluoro-3-oxo-4-prop-2-ynyl-3,4-dihydro-2H-benzo[1,4]oxazin-6-yl)-4,5,6,7-tetrahydro-isoindole-1,3-dione. In another embodiment, the PPO-inhibitor is 1-methyl-6-trifluoromethyl-3-(2,2,7-trifluoro-3-oxo-4-prop-2-ynyl-3,4-dihydro-2H-benzo[1,4]oxazin-6-yl)-1H-pyrimidine-2,4-dione. In another embodiment, the PPO-inhibitor is methyl (E)-4-[2-chloro-5-[4-chloro-5-(difluoromethoxy)-1H-methylpyrazol-3-yl]-4-fluoro-phenoxy]-3-methoxy-but-2-enoate. In another embodiment, the PPO-inhibitor is and 3-[7-chloro-5-fluoro-2-(trifluoromethyl)-1H-benzimidazol-4-yl]-1-methyl-6-(trifluoromethyl)-1H-pyrimidine-2,4-dione. In another embodiment, the PPO-inhibitor is 2-[2-chloro-5-[3-chloro-5-(trifluoromethyl)-2-pyridinyl]-4-fluorophenoxy]-2-methoxy-acetic acid methyl ester. In another embodiment, the PPO-inhibitor is 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy]-acetic acid methyl ester. In another embodiment, the PPO-inhibitor is 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy] acetic acid ethyl ester. In another embodiment, the PPO-inhibitor is methyl 2-[[3-[2-chloro-5-[4-(difluoromethyl)-3-methyl-5-oxo-1,2,4-triazol-1-yl]-4-fluorophenoxy]-2-pyridyl]oxy]acetate. In another embodiment, the PPO-inhibitor is ethyl 2-[[3-[2-chloro-5-[4-(difluoromethyl)-3-methyl-5-oxo-1,2,4-triazol-1-yl]-4-fluoro-phenoxy]-2-pyridyl]oxy]acetate. In another embodiment, the PPO-inhibitor is 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy]-acetic acid methyl ester. In another embodiment, the PPO-inhibitor is 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy] acetic acid ethyl ester. In another embodiment, the PPO-inhibitor is 2-[2-[[3-chloro-6-[3,6-dihydro-3-methyl-2,6-dioxo-4-(trifluoromethyl)-1(2H)pyrimidinyl]-5-fluoro-2-pyridinyl]oxy]phenoxy]-N-(methylsulfonyl)-acetamide. In another embodiment, the PPO-inhibitor is 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy]-N(methylsulfonyl)-acetamide.

Preferably, the PPO-inhibitor is a compound of formula (II)

(II)

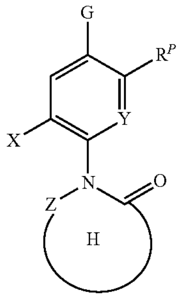

wherein the variables have the following meaning

X is H, F, or Cl;

Y is CH, or N;

Z is C(=O), or N;

H is a 5- to 9-membered saturated, partially unsaturated, or fully unsaturated heterocyclic ring or ring system, wherein said heterocyclic ring or ring system comprises one or more, same or different heteroatoms O, N, or S in addition to the N-atom that connects the ring H to the remainder of formula (II), and is unsubstituted, or substituted with one or more, same or different substituents $R^H$, and wherein said N- and S-atoms are independently oxidized, or non-oxidized;

$R^H$ is $C_1$-$C_4$-alkyl, which is unsubstituted, or halogenated;

or two geminal substituents $R^H$ form together with the atom to which they are bound a group =O, =S, or =$C(CH_3)_2$;

$R^P$ is selected from the following groups $R^{P1}$ to $R^{P10}$;

($R^{P1}$)

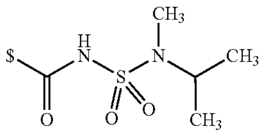

($R^{P2}$)

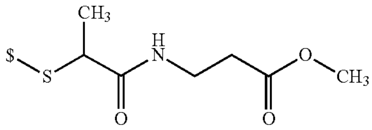

($R^{P3}$)

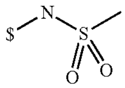

($R^{P4}$)

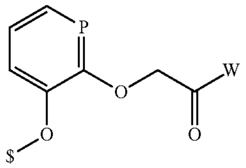

($R^{P5}$)

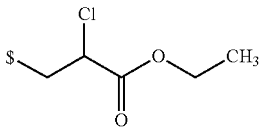

($R^{P6}$)

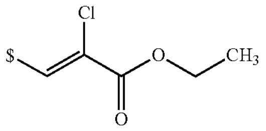

($R^{P7}$)

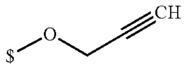

($R^{P8}$)

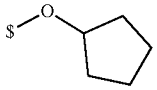

-continued ($R^{P9}$)

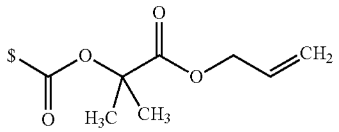

($R^{P1}$)

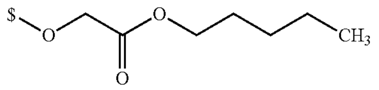

wherein $ means the connection to the remainder of the molecule; wherein P is CH or N; and wherein W is $OCH_3$, $OCH_2CH_3$, $NHSO_2CH_3$;

G is Cl;

or G and $R^P$ form together one of the following groups (II-A) or (II-B)

(II-A)

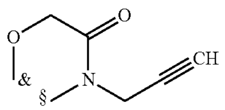

(II-B)

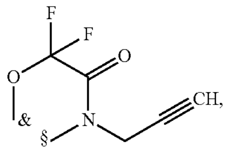

wherein & means the connection to the remainder of the molecule at the carbon atom to which the variable G is connected in formula (II), and wherein § means the connection to the remainder of the molecule at the carbon atom to which the variable $R^P$ is connected in formula (II).

The 5- to 9-membered saturated, partially unsaturated, or fully unsaturated heterocyclic ring or ring system H typically relates to a group selected from H1 to H7

(H1)

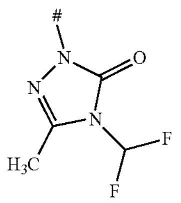

(H2)

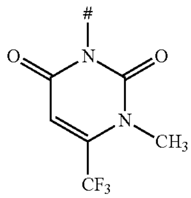

-continued (H3)

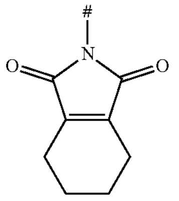

(H4)

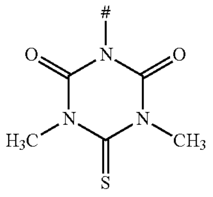

(H5)

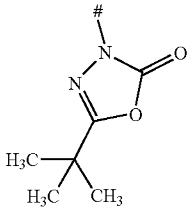

(H6)

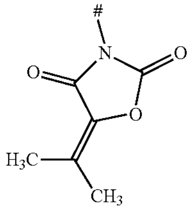

(H7)

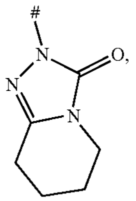

wherein # means the connection to the remainder of formula (II).

In a preferred embodiment, the PPO-inhibitor is preferably selected from azafenidin, butafenacil, carfentrazone, carfentrazone-ethyl, cinidon-ethyl, flumiclorac, flumiclorac-pentyl, flumioxazin, fluthiacet, fluthiacet-methyl, oxadiargyl, oxadiazon, pentoxazone, profluazol saflufenacil, sulfentrazone, thidiazimin, tiafenacil, trifludimoxazin, ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy] acetate (CAS 353292-31-6; S-3100; epyrifenacil), 3-[7-fluoro-3-oxo-4-(prop-2-ynyl)-3,4-dihydro-2H-benzo[1,4] oxazin-6-yl]-1,5-dimethyl-6-thioxo-[1,3,5]triazinan-2,4-dione (CAS 451484-50-7), 2-(2,2,7-trifluoro-3-oxo-4-prop-2-ynyl-3,4-dihydro-2Hbenzo[1,4]oxazin-6-yl)-4,5,6,7-tetrahydro-isoindole-1,3-dione (CAS 1300118-96-0), 1-methyl-6-trifluoromethyl-3-(2,2,7-trifluoro-3-oxo-4-prop-2-ynyl-3,4-dihydro-2Hbenzo[1,4]oxazin-6-yl)-1H-pyrimidine-2,4-dione (CAS 1304113-05-0), 3-[7-chloro-5-fluoro-2-(trifluoromethyl)-1H-benzimidazol-4-yl]-1-methyl-6-(trifluoromethyl)-1H-pyrimidine-2,4-dione (CAS 212754-02-4), 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy]-acetic acid methyl ester (CAS 2158274-96-3), 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy] acetic acid ethyl ester (CAS 2158274-50-9), methyl 2-[[3-[2-chloro-5-[4-(difluoromethyl)-3-methyl-5-oxo-1,2,4-triazol-1-yl]-4-fluoro-phenoxy]-2-pyridyl]oxy]acetate (CAS 2271389-22-9), ethyl 2-[[3-[2-chloro-5-[4-(difluoromethyl)-3-methyl-5-oxo-1,2,4-triazol-1-yl]-4-fluoro-phenoxy]-2-pyridyl]oxy]acetate (CAS 2230679-62-4), 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy]-aceticacid methyl ester (CAS 2158275-73-9), 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy] acetic acid ethyl ester (CAS 2158274-56-5), 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy]-N(methylsulfonyl)-acetamide (CAS 2158274-53-2), and 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy]-N-(methylsulfonyl)-acetamide (CAS 2158276-22-1).

In one embodiment, the PPO-inhibitor is a compound of formula (V)

(V)

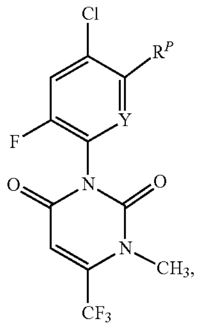

wherein all variables are as defined for formula (II), preferably wherein $R^P$ is selected from $R^{P1}$, $R^{P2}$, and $R^{P4}$.

In another preferred embodiment, the PPO-inhibitor is selected from saflufenacil, tiafenacil, ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (CAS 353292-31-6; S-3100; epyrifenacil), 1-methyl-6-trifluoromethyl-3-(2,2,7-trifluoro-3-oxo-4-prop-2-ynyl-3,4-dihydro-2Hbenzo[1,4]oxazin-6-yl)-1H-pyrimidine-2,4-dione (CAS 1304113-05-0), 3-[7-chloro-5-fluoro-2-(trifluoromethyl)-1H-benzimidazol-4-yl]-1-methyl-6-(trifluoromethyl)-1H-pyrimidine-2,4-dione (CAS 212754-02-4), 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy]-acetic acid methyl ester (CAS 2158274-96-3), 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy] acetic acid ethyl ester (CAS 2158274-50-9), 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy]-aceticacid methyl ester (CAS 2158275-73-9), 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy] acetic acid ethyl ester (CAS 2158274-56-5), 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy]-N(methylsulfonyl)-acetamide (CAS 2158274-53-2), and 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy]-N-(methylsulfonyl)-acetamide (CAS 2158276-22-1).

In another preferred embodiment, the PPO-inhibitor is selected from saflufenacil, tiafenacil, ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (CAS 353292-31-6; S-3100; epyrifenacil), 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy] acetic acid ethyl ester (CAS 2158274-50-9), 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy]-aceticacid methyl ester (CAS 2158275-73-9), 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy] acetic acid ethyl ester (CAS 2158274-56-5), and 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]-oxy]-N-(methylsulfonyl)-acetamide (CAS 2158276-22-1).

In one embodiment, the PPO-inhibitor is a compound of formula (VI)

(VI)

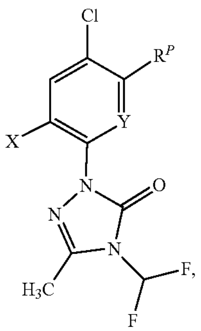

wherein all variables are as defined for formula (II), preferably wherein $R^P$ is selected from $R^{P3}$, $R^{P4}$, and $R^{P5}$.

In another preferred embodiment, the PPO-inhibitor is selected from carfentrazone, carfentrazone-ethyl, sulfentrazone, methyl 2-[[3-[2-chloro-5-[4-(difluoromethyl)-3-methyl-5-oxo-1,2,4-triazol-1-yl]-4-fluoro-phenoxy]-2-pyridyl]oxy]acetate (CAS 2271389-22-9), ethyl 2-[[3-[2-chloro-5-[4-(difluoromethyl)-3-methyl-5-oxo-1,2,4-triazol-1-yl]-4-fluoro-phenoxy]-2-pyridyl]oxy]acetate (CAS 2230679-62-4).

In another preferred embodiment, the PPO-inhibitor is selected from carfentrazone-ethyl, sulfentrazone, ethyl 2-[[3-[2-chloro-5-[4-(difluoromethyl)-3-methyl-5-oxo-1,2,4-triazol-1-yl]-4-fluoro-phenoxy]-2-pyridyl]oxy]acetate (CAS 2230679-62-4).

In another preferred embodiment, the PPO-inhibitor is selected from trifludimoxazin, 3-[7-fluoro-3-oxo-4-(prop-2-ynyl)-3,4-dihydro-2H-benzo[1,4]oxazin-6-yl]-1,5-dimethyl-6-thioxo-[1,3,5]triazinan-2,4-dione (CAS 451484-50-7).

In another preferred embodiment, the PPO-inhibitor is trifludimoxazin.

In another preferred embodiment, the PPO-inhibitor is selected from cinidon-ethyl, flumiclorac, flumiclorac-pentyl, flumioxazin, 2-(2,2,7-trifluoro-3-oxo-4-prop-2-ynyl-3,4-dihydro-2Hbenzo[1,4]oxazin-6-yl)-4,5,6,7-tetrahydro-isoindole-1,3-dione (CAS 1300118-96-0).

In another preferred embodiment, the PPO-inhibitor is flumioxazin.

It was surprisingly found that the beneficial effects of the liquid herbicidal composition as described herein are particularly pronounced for compounds of formula (II), whereas other PPO-inhibitors like diphenyl-ether derivatives like lactofen, oxyfluorfen, formesafen, acifluorfen, or bifenox did not, or to a vastly lower extent show these effects.

Accordingly, in one embodiment, the invention relates to a herbicidal composition comprising a) a PPO-inhibitor or an agrochemically acceptable salt, stereoisomer, tautomer, or N-oxide thereof; and b) a compound of formula (I), wherein R is $C_{10}$-$C_{14}$-alkyl;

each A is independently a group

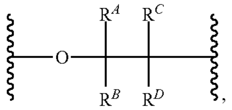

wherein $R^A$, $R^B$, $R^C$, and $R^D$ are H;

the index x is a number from 1 to 5; and $M^+$ is an alkali metal cation, preferably $Na^+$ or $K^+$, more preferably $Na^+$.

In another embodiment, the invention relates to a herbicidal composition comprising a) a PPO-inhibitor or an agrochemically acceptable salt, stereoisomer, tautomer, or N-oxide thereof; and b) a compound of formula (I), wherein R is $C_{10}$-$C_{14}$-alkyl;

each A is independently a group

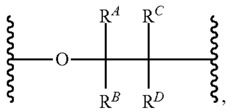

wherein $R^A$, $R^B$, $R^C$, and $R^D$ are H;

the index x is a number from 1 to 5; and $M^+$ is $NH_4^+$.

In another embodiment, the invention relates to a herbicidal composition comprising a) a PPO-inhibitor or an agrochemically acceptable salt, stereoisomer, tautomer, or N-oxide thereof; and b) a compound of formula (I), wherein R is $C_{10}$-$C_{14}$-alkyl;

each A is independently a group

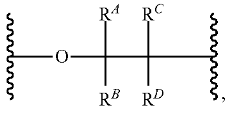

wherein $R^A$, $R^B$, $R^C$, and $R^D$ are H;

the index x is a number from 1 to 5; and $M^+$ is a monovalent cation selected from γ) ammonium cations of a primary, secondary, and tertiary amines; and 5) quaternary ammonium cations, and mixtures thereof; wherein the molecular weight of the ammonium cations γ) or of the quaternary ammonium cation δ) is from 32 to 200 g/mol.

In another embodiment, the invention relates to a herbicidal composition comprising a) a PPO-inhibitor or an agrochemically acceptable salt, stereoisomer, tautomer, or N-oxide thereof; and b) a compound of formula (I), wherein R is $C_{10}$-$C_{14}$-alkyl;

each A is independently a group

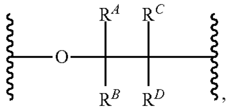
, wherein $R^A$, $R^B$, $R^C$, and $R^D$ are H;

the index x is a number from 1 to 5; and $M^+$ is a monovalent cation of formula (III)

(III)

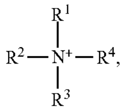
, wherein $R^1$, $R^2$, $R^3$, and $R^4$ are independently H, or $C_1$-$C_{10}$-alkyl, which is unsubstituted or substituted with OH, $C_1$-$C_{10}$-alkoxy, or hydroxy-$C_1$-$C_{10}$-alkoxy; or two of the substituents $R^1$, $R^2$, $R^3$, and $R^4$ form, together with the N-atom to which they are bound, a 5-, or 6-membered, saturated, partially- or fully unsaturated heterocycle containing additionally none, one or two atoms O, or S, and wherein said S-atom(s) are independently oxidized or non-oxidized;

with the proviso that at least one substituent $R^1$, $R^2$, $R^3$, or $R^4$ is not H;

wherein the molecular weight of the cations of formula (III) is from 32 to 200 g/mol.

In another embodiment, the invention relates to a herbicidal composition comprising a) a PPO-inhibitor or an agrochemically acceptable salt, stereoisomer, tautomer, or N-oxide thereof; and b) a compound of formula (I), wherein R is $C_{10}$-$C_{14}$-alkyl;

each A is independently a group

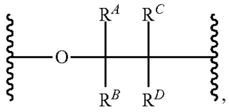
, wherein $R^A$, $R^B$, $R^C$, and $R^D$ are H;

the index x is a number from 1 to 5; and $M^+$ is a protonated amine selected from ethanolamine, diethanolamine, diglycolamine, 1-aminopropan-2-ol, 2-dimethylaminoethanol, 2-(butylamino)ethanol, 2-diethylaminoethanol, 2-(tert-butylamino)ethanol, N-(tert-butyl)diethanolamine, triethanolamine, 2-ethylaminoethanol, 2-aminoheptan, triisopropylamine, N-(2-hydroxyethyl)morpholin, N-methylmorpholine, N-butyldiethanolamin, 2-(dibutylamino)ethanol, or a quaternary ammonium cation selected from 2-hydroxyethyltrimethyl ammonium, trishydroxyethylmethyl ammonium and mixtures thereof.

In another embodiment, the invention relates to a herbicidal composition comprising a) a PPO-inhibitor or an agrochemically acceptable salt, stereoisomer, tautomer, or N-oxide thereof; and b) a compound of formula (I), wherein R is $C_{10}$-$C_{14}$-alkyl;

each A is independently a group

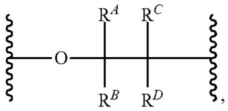
, wherein $R^A$, $R^B$, $R^C$, and $R^D$ are H;

the index x is a number from 1 to 5; and $M^+$ is a protonated amine selected from triethanolamine, 2-ethylaminoethanol, 2-aminoheptane, triisopropylamine, N-(2-hydroxyethyl)morpholin, N-methylmorpholine, N-butyldiethanolamin, 2-(dibutylamino)ethanol, or a mixture thereof.

In another embodiment, the invention relates to a herbicidal composition comprising a) a PPO-inhibitor or an agrochemically acceptable salt, stereoisomer, tautomer, or N-oxide thereof; and b) a compound of formula (I), wherein R is $C_{10}$-$C_{14}$-alkyl;

each A is independently a group

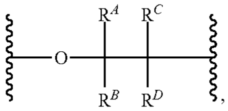
, wherein $R^A$, $R^B$, $R^C$, and $R^D$ are H;

the index x is a number from 1 to 5; and $M^+$ is a mixture of an alkali metal cation with at least one cation selected from γ) ammonium cations of a primary, secondary, and tertiary amines; and 5) quaternary ammonium cations, and mixtures thereof;

wherein the molecular weight of the ammonium cations γ) or of the quaternary ammonium cation δ) is from 32 to 200 g/mol.

The liquid herbicidal composition may contain an amine component selected from primary, secondary, tertiary amines, and ammonium salts thereof, and quaternary ammonium salts; wherein the molecular weight of the primary, secondary or tertiary amines, of the ammonium cation in the ammonium salts, or of the quaternary ammonium cation in the quaternary ammonium salts is from 32 to 200 g/mol. The amine component is commercially available.

The herbicidal composition may comprise the amine component in a concentration of at least 1 wt %, preferably at least 5 wt % more preferably at least 10 wt %, most preferably at least 15 wt %, in particular at least 20 wt %, and especially at least 30 wt %, such as at least 40 wt % based on the total weight of the herbicidal composition. The herbicidal composition may comprise the amine component in a concentration of up to 90 wt %, preferably up to 70 wt %, more preferably up to 50 wt % based on the total weight of the herbicidal composition. The herbicidal composition may comprise the amine component in a concentration of from 5 to 70 wt %, preferably 5 to 50 wt %, more preferably 10 to 50 wt %, most preferably 15 to 40 wt % based on the total weight of the herbicidal composition.

Accordingly, the invention also pertains to herbicidal compositions comprising a) a PPO-inhibitor or an agrochemically acceptable salt, stereoisomer, tautomer, or N-oxide thereof;

b) an amine component selected from primary, secondary, tertiary amines, and ammonium salts thereof, and quaternary ammonium salts;

wherein the molecular weight of the primary, secondary or tertiary amines, of the ammonium cation in the ammonium salts, or of the quaternary ammonium cation in the quaternary ammonium salts is from 32 to 200 g/mol; and c) a compound of formula (I)

$$[R-(A)_x-OSO_3^{31}]-M^+ \quad (I);$$

wherein

R is $C_{10}$-$C_{16}$-alkyl, $C_{10}$-$C_{16}$-alkenyl, or $C_{10}$-$C_{16}$-alkynyl;

each A is independently a group

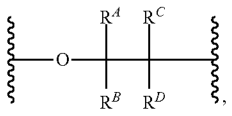

wherein $R^A$, $R^B$, $R^C$, and $R^D$ are independently H, $CH_3$, or $CH_2CH_3$ with the proviso that the sum of C-atoms of $R^A$, $R^B$, $R^C$, and $R^D$ is up to 2;

$M^+$ is a monovalent cation; and the index x is a number from 1 to 10.

If the amine component contains an ammonium salt or a quaternary ammonium salt, the monovalent cation $M^+$ in formula (I) is typically different from the ammonium cation in said salts.

In one embodiment, the invention also pertains to herbicidal compositions comprising a) a PPO-inhibitor or an agrochemically acceptable salt, stereoisomer, tautomer, or N-oxide thereof;

b) an amine component selected from primary, secondary, tertiary amines, and ammonium salts thereof, and quaternary ammonium salts;

wherein the molecular weight of the primary, secondary or tertiary amines, of the ammonium cation in the ammonium salts, or of the quaternary ammonium cation in the quaternary ammonium salts is from 32 to 200 g/mol; and c) a compound of formula (I)

$$[R-(A)_x-OSO_3^-]-M^+ \quad (I);$$

wherein

R is $C_{10}$-$C_{16}$-alkyl, $C_{10}$-$C_{16}$-alkenyl, or $C_{10}$-$C_{16}$-alkynyl;

each A is independently a group

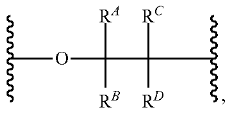

wherein $R^A$, $R^B$, $R^C$, and $R^D$ are independently H, $CH_3$, or $CH_2CH_3$ with the proviso that the sum of C-atoms of $R^A$, $R^B$, $R^C$, and $R^D$ is up to 2;

$M^+$ is an alkali metal salt or $NH_4^+$, preferably $Na^+$; and the index x is a number from 1 to 10.

In one embodiment, the amine component comprises a primary, secondary, tertiary amine or an ammonium salt thereof (i.e. the salt of a protonated primary, secondary or tertiary amine). In another embodiment, the amine component is a quaternary ammonium salt. Typically, the amine component contains only one nitrogen atom per molecule.

The definitions, preferences, embodiments, and characteristics as described herein for the monovalent cation $Q^+$, i.e. for the situation in which $M^+$ is an ammonium cation γ) or a quaternary ammonium cation δ), are also independently valid for the amine component. In turn, the amine component may be of formula (III) or formula (IV) with the definitions, preferences, and embodiments described above.

Accordingly, the molecular weight of the primary, secondary or tertiary amine, of the ammonium cation in the ammonium salt thereof, or of the quaternary ammonium cation in the quaternary ammonium salt of the amine component is from 32 to 200 g/mol. In one embodiment, the molecular weight of the primary, secondary or tertiary amine, of the ammonium cation in the ammonium salt thereof, or of the quaternary ammonium cation in the quaternary ammonium salt in the amine component is from is at least 35 g/mol. In another embodiment, the molecular weight of the primary, secondary or tertiary amine, of the ammonium cation in the ammonium salt thereof, or of the quaternary ammonium cation in the quaternary ammonium salt in the amine component, is at least 40 g/mol. In another embodiment, the molecular weight of the primary, secondary or tertiary amine, of the ammonium cation in the ammonium salt thereof, or of the quaternary ammonium cation in the quaternary ammonium salt in the amine component, is at least 45 g/mol. In another embodiment, the molecular weight of the primary, secondary or tertiary amine, of the ammonium cation in the ammonium salt thereof, or of the quaternary ammonium cation in the quaternary ammonium salt in the amine component is at least 50 g/mol. In another embodiment, the molecular weight of the primary, secondary or tertiary amine, of the ammonium cation in the ammonium salt thereof, or of the quaternary ammonium cation in the quaternary ammonium salt of the amine component is at least 55 g/mol. In another embodiment, the molecular weight of the primary, secondary or tertiary amine, of the ammonium cation in the ammonium salt thereof, or of the quaternary ammonium cation in the quaternary ammonium salt in the amine component is at least 60 g/mol. In another embodiment, the molecular weight of the primary, secondary or tertiary amine, of the ammonium cation in the ammonium salt thereof, or of the quaternary ammonium cation in the quaternary ammonium salt in the amine component is at least 61 g/mol. In one embodiment, the molecular weight of the primary, secondary or tertiary amine, of the ammonium cation in the ammonium salt thereof, or of the quaternary ammonium cation in the quaternary ammonium salt in the amine component is up to 195 g/mol. In another embodiment, the molecular weight of the primary, secondary or tertiary amine, of the ammonium cation in the ammonium salt thereof, or of the quaternary ammonium cation in the quaternary ammonium salt in the amine component is up to 190 g/mol g/mol. In another embodiment, the molecular weight of the primary, secondary or tertiary amine, of the ammonium cation in the ammonium salt thereof, or of the quaternary ammonium cation in the quaternary ammonium salt in the amine component, is up to 185 g/mol. In another embodiment, the molecular weight of the primary, secondary or tertiary amine, of the ammonium cation in the ammonium salt thereof, or of the quaternary ammonium cation in the quaternary ammonium salt in the amine component is up to 180 g/mol. In another embodiment, the molecular weight of the primary, secondary or tertiary amine, of the ammonium cation in the ammonium salt thereof, or of the quaternary ammonium cation in the quaternary ammonium salt in the amine component is up to 175 g/mol. In another embodiment, the molecular weight of the primary, secondary or tertiary amine, of the ammonium cation in the ammonium salt thereof, or of the quaternary ammonium cation in the quaternary ammonium salt in the amine component is up to 170 g/mol. In another embodiment, the molecular weight of the primary, secondary or tertiary amine, of the ammonium cation in the ammonium salt thereof, or of the quaternary ammonium cation in the quaternary ammonium salt in the amine component is up to 160 g/mol. In another embodiment, the molecular weight of the primary, secondary or tertiary amine, of the ammonium cation in the ammonium salt thereof, or of the quaternary ammonium cation in the quaternary ammonium salt of the amine component is up to 150 g/mol. In another embodiment, the molecular weight of the primary, secondary or tertiary amine, of the ammonium cation in the ammonium salt thereof, or of the quaternary ammonium cation in the quaternary ammonium salt in the amine component is up to 140 g/mol. In another embodiment, the molecular weight of the primary, secondary or tertiary amine, of the ammonium cation in the ammonium salt thereof, or of the quaternary ammonium cation in the quaternary ammonium salt in the amine component is up to 130 g/mol. In another embodiment, the molecular weight of the primary, secondary or tertiary amine, of the ammonium cation in the ammonium salt thereof, or of the quaternary ammonium cation in the quaternary ammonium salt in the amine component is up to 120 g/mol. In another embodiment, the molecular weight of the primary, secondary or tertiary amine, of the ammonium cation in the ammonium salt thereof, or of the quaternary ammonium cation in the quaternary ammonium salt in the amine component is up to 110 g/mol. In another embodiment, the molecular weight of the primary, secondary or tertiary amine, of the ammonium cation in the ammonium salt thereof, or of the quaternary ammonium cation in the quaternary ammonium salt in the amine component is up to 105 g/mol. In one embodiment, the molecular weight of the primary, secondary or tertiary amine, of the ammonium cation in the ammonium salt thereof, or of the quaternary ammonium cation in the quaternary ammonium salt in the amine component is from 35 g/mol to 150 g/mol. In another embodiment, the molecular weight of the primary, secondary or tertiary amine, of the ammonium cation in the ammonium salt thereof, or of the quaternary ammonium cation in the quaternary ammonium salt in the amine component is from 40 g/mol to 140 g/mol. In another embodiment, the molecular weight of the primary, secondary or tertiary amine, of the ammonium cation in the ammonium salt thereof, or of the quaternary ammonium cation in the quaternary ammonium salt in the amine component is from 55 g/mol to 180 g/mol. In another embodiment, the molecular weight of the primary, secondary or tertiary amine, of the ammonium cation in the ammonium salt thereof, or of the quaternary ammonium cation in the quaternary ammonium salt in the amine component is from 50 g/mol to 120 g/mol. In another embodiment, the molecular weight of the primary, secondary or tertiary amine, of the ammonium cation in the ammonium salt thereof, or of the quaternary ammonium cation in the quaternary ammonium salt in the amine component is from 55 g/mol to 110 g/mol. In one embodiment, the molecular weight of the primary, secondary or tertiary amine, of the ammonium cation in the ammonium salt thereof, or of the quaternary ammonium cation in the quaternary ammonium salt in the amine component is from 60 g/mol to 110 g/mol.

The amine component is typically an amine selected from ethanolamine, diethanolamine, diglycolamine, 1-aminopropan-2-ol, 2-dimethylaminoethanol, 2-(butylamino)ethanol, 2-diethylaminoethanol, 2-(tert-butylamino)ethanol, N-(tert-butyl)diethanolamine, triethanolamine, 2-ethylaminoethanol, 2-aminoheptane, triisopropylamine, N-(2-hydroxyethyl)morpholin, N-methylmorpholine, N-butyldiethanolamin, 2-(dibutylamino)ethanol, or an ammonium salt thereof, i.e. the salt of a protonated amine selected from those above. In another embodiment, the amine component is a salt of a quaternary ammonium cation selected from 2-hydroxyethyltrimethyl ammonium, trishydroxyethylmethyl ammonium.

Salts of quaternary ammonium cations may contain any suitable mono, or divalent anion, preferably monovalent anion. Examples of anions are nitrate, sulfate, chloride, bromide, iodide, carbonate, bicarbonate, acetate, formate, phosphate and phosphonate. In one embodiment, the quaternary ammonium cation contains chloride as anion.

In one embodiment, the amine component is ethanolamine or an ammonium salt thereof. In another embodiment, the amine component is diethanolamine or an ammonium salt thereof. In another embodiment, the amine component is diglycolamine or an ammonium salt thereof. In another embodiment, the amine component is 1-aminopropan-2-ol or an ammonium salt thereof. In another embodiment, the amine component is 2-dimethylaminoethanol or an ammonium salt thereof. In another embodiment, the amine component is 2-(butylamino)ethanol or an ammonium salt thereof. In another embodiment, the amine component is protonated 2-diethylaminoethanol or an ammonium salt thereof. In another embodiment, the amine component is 2-(tert-butylamino)ethanol or an ammonium salt thereof. In another embodiment, the amine component is N-(tert-butyl)diethanolamine or an ammonium salt thereof. In another embodiment, the amine component is triethanolamine or an ammonium salt thereof. In another embodiment, the amine component is 2-ethylaminoethanol or an ammonium salt thereof. In another embodiment, the amine component is 2-aminoheptan or an ammonium salt thereof. In another embodiment, the amine component is triisopropylamine or an ammonium salt thereof. In another embodiment, the amine component is N-(2-hydroxyethyl)morpholin or an ammonium salt thereof, In another embodiment, the amine component is N-methylmorpholine or an ammonium salt thereof. In another embodiment, the amine component is protonated N-butyldiethanolamine or an ammonium salt thereof. In another embodiment, the amine component is 2-(dibutylamino)ethanol or an ammonium salt thereof. In another embodiment, the amine component is a salt of 2-hydroxyethyltrimethyl ammonium. In another embodiment, the amine component is a salt of trishydroxyethylmethyl ammonium.

In another embodiment, the amine component is selected from ethanolamine, diethanolamine, diglycolamine, 1-aminopropan-2-ol, 2-dimethylaminoethanol, or an ammonium salt thereof, or a salt of trishydroxyethylmethyl ammonium. In another embodiment, the amine component is selected from ethanolamine, diglycolamine, triethanolamine, and ammonium salts thereof, and a salt of 2-hydroxyethyltrimethyl ammonium.

The primary, secondary or tertiary amine E in the amine component and the protonated ammonium form $E^+$ in the amine component—falling under the definition of the monovalent cation $Q^+$—form a conjugated acid/base pair and are in equilibrium in aqueous conditions as displayed in Scheme 4

$$E^+ + H_2O \leftrightarrows E + H_3O^+ \qquad \text{Scheme 4:}$$

It is thus apparent that the primary, secondary, and tertiary amine in the amine base are in equilibrium with the ammonium cations thereof in aqueous conditions. It is also apparent that monovalent cations $M^+$ in compounds of formula (I) may be deprotonated and/or exchanged by a different cation, such as a cation $E^+$ or a quaternary ammonium cation of the amine component.

The molar ratio of protonated amines to non-protonated amines—including those that may be present as ammonium salts γ) in compounds of formula (I) and in the amine component—in the herbicidal composition is typically at least 1:1, preferably at least 3:1, more preferably at least 5:1 most preferably at least 10:1. The molar ratio of protonated amines to non-protonated amines in the herbicidal composition is typically up to 50:1, preferably up to 20:1, more preferably up to 15:1 most preferably up to 8:1.

The ratio is dependent of the pH of the liquid herbicidal composition. The pH is typically from 5 to 12, preferably from 6 to 10, more preferably from 6.5 to 9. The pH may be adjusted by the addition of an acid, such as HCl, $H_2SO_4$, $H_2SO_3$, or methylsulfonic acid. By addition of an acid, the primary, secondary and tertiary amines are protonated and present in the form of its ammonium salt, such as the chloride salt, the sulfate salt, the sulfonate salt, or the methyl sulfonate salt. Thus, the ammonium salt of the primary, secondary or tertiary amine is formed in situ by reaction of the acid with the respective amine. Alternatively, the respective ammonium salt of the primary, secondary or tertiary amine may be added to the composition as amine component.

The molar ratio of the amine component to compounds of formula (I) is typically from 100:1 to 1:100, preferably from 50:1 to 1:50, more preferably from 10:1 to 1:10.

The herbicidal composition relates to any liquid customary types of agrochemical compositions, e. g. solutions, emulsions, or suspensions. Typically, the PPO-inhibitor and the compound of formula (I) are present in dissolved form in the composition. In one embodiment, the PPO-inhibitor is present in dissolved form. In another embodiment, the PPO-inhibitor is present in particulate form as suspended solid particles, e.g. with a particles size (d50) of from 0.1 to 15 μm.

Examples for composition types are solutions, suspensions (e.g. SC, OD, FS), emulsifiable concentrates (e.g. EC), and emulsions (e.g. EW, EO, ES, ME), and capsule formulations (e.g. CS, ZC). These and further compositions types are defined in the "Catalogue of pesticide formulation types and international coding system", Technical Monograph No. 2, 6th Ed. May 2008, CropLife International. The herbicidal composition is a liquid composition, i.e. it contains a liquid continuous phase. Typically, the herbicidal composition is an aqueous herbicidal composition or a herbicidal composition with a continuous oily phase containing a non-aqueous organic solvent. Preferred formulation types of the herbicidal composition are solutions, emulsifiable concentrates, and dispersions, more preferably aqueous solutions and oil dispersions, most preferably oil dispersions. Typically, the compound of formula (I) and optionally the amine component are present in dissolved state in the herbicidal composition. The PPO-inhibitor is typically either present in dissolved or in suspended form in the herbicidal composition. If the herbicidal composition is an aqueous composition, the PPO-inhibitor is typically dissolved. If the herbicidal composition is an oily composition, the agrochemical active ingredient is typically present in particulate form as suspended particles, in particular in oil dispersions.

Accordingly, the herbicidal composition may comprise water. Typically, the herbicidal composition comprises water in a concentration of at least 1 wt %, preferably at least 5 wt, more preferably at least 10 wt %, most preferably at least 20 wt %. The herbicidal composition may comprise water in a concentration of up to 50 wt %, preferably up to 40 wt %, more preferably up to 30 wt %, and in particular up to 25 wt %. The herbicidal composition typically comprises water in a concentration of from 1 to 50 wt %, preferably from 5 to 30 wt %. If the concentration of water in the herbicidal composition is at least 5 wt %, such compositions may be referred to as aqueous compositions.

The herbicidal composition may also comprise at least one organic solvent. Typically, the herbicidal composition comprises the organic solvent in a concentration of at least 1 wt %, preferably at least 5 wt, more preferably at least 15 wt %. The herbicidal composition may comprise the organic solvent in a concentration of up to 60 wt %, preferably up to 50 wt %, more preferably up to 45 wt %, and in particular up to 35 wt %. The herbicidal composition typically comprises the organic solvent in a concentration of from 5 to 50 wt %, preferably from 10 to 40 wt %. If the concentration of water in the herbicidal composition is at least 20 wt %, such compositions may be referred to as "oily" compositions. Suitable organic solvents are defined herein below. Preferred are such organic solvents that have a water-solubility of at least 1 wt % at 20° C., preferably at least 10 wt % at 20° C.

Suitable organic solvents are aliphatic hydrocarbons, preferably an aliphatic $C_5$-$C_1$-hydrocarbon, more preferably a $C_5$-$C_{16}$-alkane, or $C_5$-$C_{16}$-cycloalkane, such as pentane, hexane, cyclohexane, or petrol ether; aromatic hydrocarbons, preferably an aromatic $C_6$-$C_{10}$-hydrocarbons, such as benzene, toluene, o-, m-, and p-xylene; halogenated hydrocarbons, preferably halogenated aliphatic $C_1$-$C_6$-alkanes, or halogenated aromatic $C_6$-$C_{10}$-hydrocarbons, such as $CH_2Cl_2$, $CHCl_3$, $CCl_4$, $CH_2ClCH_2Cl$, $CCl_3CH_3$, $CHCl_2CH_2Cl$, $CCl_2CCl_2$, or chlorobenzene; ethers, preferably $C_1$-$C_6$-cycloalkyl ethers, $C_1$-$C_6$-alkyl-$C_1$-$C_6$-alkyl ethers and $C_1$-$C_6$-alkyl-$C_6$-$C_{10}$-aryl ethers, such as $CH_3CH_2OCH_2CH_3$, $(CH_3)_2CHOCH(CH_3)_2$, $CH_3OC(CH_3)_3$ (MTBE), $CH_3OCH_3$ (DME), $CH_3OCH_2CH_2OCH_3$, dioxane, anisole, and tetrahydrofurane (THF); esters, preferably esters of aliphatic $C_1$-$C_6$-alcohols with aliphatic $C_1$-$C_6$-carboxylic acids, esters of aromatic $C_5$-$C_{10}$-alcohols with aromatic $C_5$-$C_{10}$-carboxylic acids, cyclic esters of ω-hydroxy-$C_1$-$C_6$-carboxylic acids, such as $CH_3C(O)OCH_2CH_3$, $CH_3C(O)OCH_3$, $CH_3C(O)OCH_2CH_2CH_2CH_3$, $CH_3C(O)OCH(CH_3)CH_2CH_3$, $CH_3C(O)OC(CH_3)$, $CH_3CH_2CH_2C(O)OCH_2CH_3$, $CH_3CH(OH)C(O)OCH_2CH_3$, $CH_3CH(OH)C(O)OCH_3$, $CH_3C(O)OCH_2CH(CH_3)_2$, $CH_3C(O)OCH(CH_3)_2$, $CH_3CH_2C(O)OCH_3$, benzyl benzoate, and γ-butyrolactone; carbonates, such as ethylene carbonate, propylene carbonate, $CH_3CH_2OC(O)OCH_2CH_3$, and $CH_3OC(O)OCH_3$; nitriles, preferably $C_1$-$C_6$-nitriles, such as $CH_3CN$, and $CH_3CH_2CN$; ketones, preferably $C_1$-$C_5$-alkyl-$C_1$-$C_5$-alkyl ketones, such as $CH_3C(O)CH_3$, $CH_3C(O)CH_2CH_3$, $CH_3CH_2C(O)CH_2CH_3$, and $CH_3C(O)C(CH_3)_3$ (MTBK); alcohols, preferably $C_1$-$C_4$-alcohols, such as $CH_3OH$, $CH_3CH_2OH$, $CH_3CH_2CH_2OH$, $CH_3CH(OH)CH_3$, $CH_3(CH_2)_3OH$, $C(CH_3)_3OH$, propylene glycol, dipropylene glycol, propylene glycol monomethylether (1-methoxy-2-propanol); amides and urea derivatives, preferably dimethyl formamide (DMF), N-methyl-2-pyrrolidone (NMP), dimethyl acetamide (DMA), 1,3-dimethyl-2-imidazolidinone (DMI), 1,3-dimethyl-3,4,5,6-tetrahydro-2(1H)-pyrimidinone (DMPU), hexamethylphosphamide (HMPA); moreover dimethyl sulfoxide (DMSO), and sulfolane. Preferred solvents are propylene glycol, dipropylene glycol and propyleneglycol monomethyl ether, more preferred propylene glycol and dipropylene glycol.

The herbicidal compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005. The invention also relates to a method of producing the herbicidal composition comprising the step of contacting the PPO-inhibitor with the compound of formula (I) and optionally the amine component in any given order. In one embodiment, the method of producing the herbicidal composition comprises the steps of a) contacting the amine component with the compound of formula (I); and b) contacting the PPO-inhibitor with the compound of formula (I), wherein steps a) and b) may be carried out in any given order. Typically, the method for producing the herbicidal composition also includes a step of adding water at either stage of the method. The contacting may usually be carried out by mixing, co-spraying, or milling the compounds together.

The herbicidal composition typically comprises at least one auxiliary. Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents as defined herein below.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the compound I on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates. Suitable bactericides are bronopol and isothiazolinone derivatives such as alkylisothiazolinones and benzisothiazolinones. Suitable anti-freezing agents are ethylene glycol, propylene glycol, urea and glycerin. Suitable anti-foaming agents are silicones, long chain alcohols, and salts of fatty acids. Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants). Suitable tackifiers or binders are polyvinylpyrrolidons, polyvinylacetates, polyvinyl alcohols, polyacrylates, biological or synthetic waxes, and cellulose ethers.

Examples for composition types and their preparation are:

i) Water-Soluble Concentrates (SL, LS)

10-60 wt % of the PPO-inhibitor, 5-60 wt % of the compound of formula (I) and optionally 1-50 wt % of the amine component are dissolved in water and/or in a water-soluble solvent (e.g. alcohols) ad 100 wt %.

ii) Dispersible Concentrates (DC)

5-25 wt % of the PPO-inhibitor, 5 to 60 wt % of the compound of formula (I), optionally 1-50 wt % of the amine component, and 1-10 wt % dispersant (e. g. polyvinylpyrrolidone) are dissolved in organic solvent (e.g. cyclohexanone) ad 100 wt %. Dilution with water gives a dispersion.

iii) Emulsifiable Concentrates (EC)

15-70 wt % of the PPO-inhibitor, 5-10 wt % emulsifiers (e.g. calcium dodecylbenzenesulfonate and castor oil ethoxylate), 5-60 wt % of the compound of formula (I), and optionally 1 to 50 wt % of the amine component are dissolved in water-insoluble organic solvent (e.g. aromatic hydrocarbon) ad 100 wt %. Dilution with water gives an emulsion.

iv) Emulsions (EW, EO, ES)

5-40 wt % of the PPO-inhibitor and 1-10 wt % emulsifiers (e.g. calcium dodecylbenzenesulfonate and castor oil ethoxylate) 5-60 wt % of compound of formula (I) and optionally 1-50 wt % of the amine component are dissolved in 20-40 wt % water-insoluble organic solvent (e.g. aromatic hydrocarbon). This mixture is introduced into water ad 100 wt % by means of an emulsifying machine and made into a homogeneous emulsion. Dilution with water gives an emulsion.

v) Suspensions (SC, OD, FS)

In an agitated ball mill, 20-60 wt % of PPO-inhibitor are comminuted with addition of 2-10 wt % dispersants and wetting agents (e.g. sodium lignosulfonate and alcohol ethoxylate), 0, 1-2 wt % thickener (e.g. xanthan gum), 5-60 wt % of the compound of formula (I), optionally 1-50 wt % of the amine component, and water ad 100 wt % to give a fine active substance suspension. Dilution with water gives a stable suspension of the active substance. For FS type composition up to 40 wt % binder (e.g. polyvinylalcohol) is added.

vi) Microemulsion (ME)

5-20 wt % of the PPO-inhibitor are added to 5-30 wt % organic solvent blend (e.g. fatty acid dimethylamide and cyclohexanone), 10-25 wt % surfactant blend (e.g. alkohol ethoxylate and arylphenol ethoxylate), optionally 1-50 wt % of the amine component, and 5-60 wt % of the compound of formula (I) and water ad 100%. This mixture is stirred for 1 h to produce spontaneously a thermodynamically stable microemulsion.

vii) Microcapsules (CS)

An oil phase comprising 5-50 wt % of PPO-inhibitor, 0-40 wt % water insoluble organic solvent (e.g. aromatic hydrocarbon), 5-60 wt % of compound of formula (I), optionally 5-50 wt % of the amine component, 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of the PPO-inhibitor, 5-50 wt % of the compound of formula (I), 0-40 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the formation of a polyurea microcapsules. The microcapsules are added to an aqueous composition optionally containing 1-50 wt % of the amine component. The monomers amount to 1-10 wt %. The wt % relate to the total CS composition.

The compositions types i) to vii) may optionally comprise further auxiliaries, such as 0,1-1 wt % bactericides, 5-15 wt % anti-freezing agents, 0,1-1 wt % anti-foaming agents, and 0,1-1 wt % colorants.

Solutions for seed treatment (LS), Suspoemulsions (SE), flowable concentrates (FS), emulsions (ES), emulsifiable concentrates (EC) are usually employed for the purposes of treatment of plant propagation materials, particularly seeds. The compositions in question give, after two-to-tenfold dilution, concentrations of the PPO-inhibitor of from 0.01 to 60% by weight, preferably from 0.1 to 40% by weight, in the ready-to-use preparations. Application can be carried out before or during sowing. Methods for applying the herbicidal composition, on to plant propagation material, especially seeds include dressing, coating, pelleting, dusting, soaking and in-furrow application methods of the propagation material. Preferably, the herbicidal composition is applied on to the plant propagation material by a method such that germination is not induced, e. g. by seed dressing, pelleting, coating and dusting.

Various types of oils, wetters, adjuvants, fertilizer, or micronutrients, and further pesticides (e.g. herbicides, insecticides, fungicides, growth regulators, safeners) may be added to the herbicidal composition comprising them as premix or, if appropriate not until immediately prior to use (tank mix). These agents can be admixed with the herbicidal compositions according to the invention in a weight ratio of 1:100 to 100:1, preferably 1:10 to 10:1.

The user applies the herbicidal composition according to the invention usually from a predosage device, a knapsack sprayer, a spray tank, a spray plane, or an irrigation system. Usually, the herbicidal composition is made up with water, buffer, and/or further auxiliaries to the desired application concentration and the ready-to-use spray liquor or the herbicidal composition according to the invention is thus obtained. Usually, 20 to 2000 liters, preferably 50 to 400 liters, of the ready-to-use spray liquor are applied per hectare of agricultural useful area.

According to one embodiment, individual components of the herbicidal composition according to the invention such as parts of a kit or parts of a binary or ternary mixture may be mixed by the user himself in a spray tank and further auxiliaries may be added, if appropriate.

In a further embodiment, either individual components of the herbicidal composition according to the invention or partially premixed components, e. g. components comprising compounds of formula (I) and/or the PPO-inhibitor and/or the amine component may be mixed by the user in a spray tank and further auxiliaries and additives may be added, if appropriate.

In a further embodiment, either individual components of the herbicidal composition according to the invention or partially premixed components, e. g. components comprising compounds of formula (I) and/or the PPO-inhibitor thereof and/or the amine component can be applied jointly (e.g. after tank mix) or consecutively.

The herbicidal compositions have a comparatively low dynamic viscosity and stay homogeneous even at high concentrations of compound of formula (I).

The dynamic viscosity as referred to herein can be measured by means of a Brookfield viscosimeter, i.e. a rotational viscosimeter with a cone-plate geometry. The dynamic viscosity may be determined according to industry standard EN ISO 2555:2018. Usually, the dynamic viscosity is measured at 25° C. In this method, the shear rate of the rotation viscosimeter is constantly increased and the shear stress is measured. For Newtonian Fluids, the measurement results in a linear dataset according to a direct proportionality between the shear stress and the shear rate. For non-Newtonian fluids, the measurement results in a non-linear dependency between shear stress and shear rate. The dynamic viscosity, also called apparent viscosity, is typically determined by measuring the slope of a line through the origin of the coordinate system and the shear stress as determined at a shear rate of 100/second. The true viscosity, which may be different from the apparent viscosity for non-Newtonian fluids, is determined by calculating the slope of the tangent of the experimental curve as measured at a shear rate of 100/second.

The agrochemical composition usually has a true viscosity at 20° C. less than to 2000 mPas, preferably less than 1000 mPas, more preferably less than 500 mPas. The agrochemical composition usually has an apparent viscosity at 20° C. less than to 3000 mPas, preferably less than 1500 mPas, more preferably less than 1000 mPas.

The herbicidal composition may contain a second agrochemical active ingredient. Typically, the second agrochemical active ingredient is a pesticide, preferably selected from fungicides, insecticides, nematicides, herbicides, safeners, micronutrients, biopesticides, nitrification inhibitors, and/or growth regulators. In one embodiment, the second agrochemical active ingredient is an insecticide. In another embodiment, the second agrochemical active ingredient is a fungicide. In yet another embodiment the second agrochemical active ingredient is a herbicide. The skilled worker is familiar with such pesticides, which can be found, for example, in the Pesticide Manual, 16th Ed. (2013), The British Crop Protection Council, London. Suitable insecticides are insecticides from the class of the carbamates, organophosphates, organochlorine insecticides, phenylpyrazoles, pyrethroids, neonicotinoids, spinosins, avermectins, milbemycins, juvenile hormone analogs, alkyl halides, organotin compounds nereistoxin analogs, benzoylureas, diacylhydrazines, and METI acarizides. Suitable fungicides are fungicides from the classes of dinitroanilines, allylamines, anilinopyrimidines, antibiotics, aromatic hydrocarbons, benzenesulfonamides, benzimidazoles, benzisothiazoles, benzophenones, benzothiadiazoles, benzotriazines, benzyl carbamates, carbamates, carboxamides, carboxylic acid diamides, chloronitriles cyanoacetamide oximes, cyanoimidazoles, cyclopropanecarboxamides, dicarboximides, dihydrodioxazines, dinitrophenyl crotonates, dithiocarbamates, dithiolanes, ethylphosphonates, ethylaminothiazolecarboxamides, guanidines, hydroxy-(2-amino)pyrimidines, hydroxyanilides, imidazoles, imidazolinones, inorganic substances, isobenzofuranones, methoxyacrylates, methoxycarbamates, morpholines, N-phenylcarbamates, oxazolidinediones, oximinoacetates, oximinoacetamides, peptidylpyrimidine nucleosides, phenylacetamides, phenylamides, phenylpyrroles, phenylureas, phosphonates, phosphorothiolates, phthalamic acids, phthalimides, piperazines, piperidines, propionamides, pyridazinones, pyridines, pyridinylmethylbenzamides, pyrimidinamines, pyrimidines, pyrimidinonehydrazones, pyrroloquinolinones, quinazolinones, quinolines, quinones, sulfamides, sulfamoyltriazoles, thiazolecarboxamides, thiocarbamates, thiophanates, thiophenecarboxamides, toluamides, triphenyltin compounds, triazines, triazoles.

Suitable herbicides are herbicides from the classes of the acetamides, amides, aryloxyphenoxypropionates, benzamides, benzofuran, benzoic acids, benzothiadiazinones, bipyridylium, carbamates, chloroacetamides, chlorocarboxylic acids, cyclohexanediones, dinitroanilines, dinitrophenol, diphenyl ether, glycines, imidazolinones, isoxazoles, isoxazolidinones, nitriles, N-phenylphthalimides, oxadiazoles, oxazolidinediones, oxyacetamides, phenoxycarboxylic acids, phenylcarbamates, phenylpyrazoles, phenylpyrazolines, phenylpyridazines, phosphinic acids, phosphoroamidates, phosphorodithioates, phthalamates, pyrazoles, pyridazinones, pyridines, pyridinecarboxylic acids, pyridinecarboxamides, pyrimidinediones, pyrimidinyl(thio)benzoates, quinolinecarboxylic acids, semicarbazones, sulfonylaminocarbonyltriazolinones, sulfonylureas, tetrazolinones, thiadiazoles, thiocarbamates, triazines, triazinones, triazoles, triazolinones, triazolocarboxamides, triazolopyrimidines, triketones, uracils, ureas. Suitable plant growth regulators are antiauxins, auxins, cytokinins, defoliants, ethylene modulators, ethylene releasers, gibberellins, growth inhibitors, morphactins, growth retardants, growth stimulators, and further unclassified plant growth regulators. Suitable micronutrients are compounds comprising boron, zinc, iron, copper, manganese, chlorine, and molybdenum.

In one embodiment, the second agrochemical active ingredient is glufosinate or a salt thereof (e.g. the ammonium salt of glufosinate). Glufosinate (CAS Reg. No. 51276-47-2), with IUPAC-Name (2RS)-2-amino-4-[hydroxy(methyl)phosphinoyl]butyric acid, or 4-[hydroxy (methyl)phosphinoyl]DL-homoalanine) or DL-4-[hydroxyl (methyl)phosphinoyl]-DL-homoalaninate, is known, as well as agronomically acceptable salts thereof, in particular glufosinate-ammonium (IUPAC-Name: ammonium (2RS)-2-amino-4-(methylphosphinato)butyric acid, CAS Reg. No. 77182-82-2).

Glufosinate as racemate and its salts are commercially available under the trade-names Basta™ and Liberty™. Glufosinate is represented by the following structure (VII):

(VII)

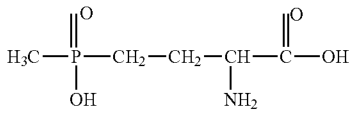

The compound of formula (VII) is a racemate.

Glufosinate is a racemate of two enantiomers, out of which only one shows sufficient herbicidal activity (see e.g. U.S. Pat. No. 4,265,654 and JP92448/83). Even though various methods to prepare L-glufosinate (and respective salts) are known, the mixtures known in the art do not point at the stereochemistry, meaning that the racemate is present (e.g. WO 2003024221, WO2011104213, WO 2016113334, WO 2009141367).

In one embodiment, the agrochemical composition comprises as second agrochemical active ingredient racemic glufosinate mixtures as described above, wherein the glufosinate comprises about 50% by weight of the L-enantiomer and about 50% by weight of the D-enantiomer. In another embodiment, the agrochemical composition comprises as second agrochemical active ingredient glufosinate, wherein at least 70% by weight of the glufosinate is L-glufosinate or a salt thereof.

L-glufosinate, with IUPAC-Name (2S)-2-amino-4-[hydroxy(methyl)phosphinoyl]butyric acid (CAS Reg. No. 35597-44-5) and also called glufosinate-P, can be obtained commercially or may be pre-pared for example as described in WO2006/104120, U.S. Pat. No. 5,530,142, EP0248357A2, EP0249188A2, EP0344683A2, EP0367145A2, EP0477902A2, EP0127429 and J. Chem. Soc. Perkin Trans. 1, 1992, 1525-1529.

Preferably, the agronomically acceptable salts of glufosinate or (L)-glufosinate are the sodium, potassium or ammonium ($NH_4^+$) salts of glufosinate or L-glufosinate, in particular glufosinate-P-ammonium (IUPAC-Name: ammonium (2S)-2-amino-4-(methylphosphinato)butyric acid, CAS Reg. No. 73777-50-1), glufosinate-P-sodium (IUPAC-Name: sodium (2S)-2-amino-4-(methylphosphinato)butyric acid; CAS Reg. No. 70033-13-5) and glufosinate-P-potassium (IUPAC-Name: potassium (2S)-2-amino-4-(methylphosphinato)butyric acid) for L-glufosinate.

Hence, the agrochemical composition may contain as second agrochemical active ingredient (L)-glufosinate-ammonium or (L)-glufosinate-sodium or (L)-glufosinate-potassium as (L)glufosinate salts and (L)-glufosinate as free acid, preferably (L)-glufosinate. Especially preferred are agrochemical compositions, which contain as second agrochemical active ingredient (L)-glufosinate-ammonium.

The term "glufosinate" as used in the present invention typically comprises, in one embodiment of the invention, about 50% by weight of the L-enantiomer and about 50% by weight of the D-enantiomer; and in another embodiment of the invention, more than 70% by weight of the L-enantiomer; preferably more than 80% by weight of the L-enantiomer; more preferably more than 90% of the L-enantiomer, most preferably more than 95% of the L-enantiomer and can be prepared as referred to above.

The herbicidal composition may comprise the second agrochemical active ingredient in a concentration of at least 1 wt %, preferably at least 5 wt % more preferably at least 10 wt %, most preferably at least 25 wt %, and in particular at least 30 wt % based on the total weight of the herbicidal composition. The herbicidal composition may comprise the second agrochemical active ingredient in a concentration of up to 90 wt %, preferably up to 70 wt %, more preferably up to 50 wt % based on the total weight of the herbicidal composition. The herbicidal composition may comprise the second agrochemical active ingredient in a concentration of from 1 to 70 wt %, preferably 1 to 60 wt %, more preferably 5 to 50 wt % based on the total weight of the composition.

Here and below, the term "binary herbicidal composition" refers to herbicidal compositions comprising the PPO-inhibitor, and glufosinate or a salt thereof.

In binary herbicidal compositions, the weight ratio of the PPO-inhibitor to glufosinate or the salt thereof is generally in the range of from 1:1000 to 1000:1, preferably in the range of from 1:500 to 500:1, in particular in the range of from 1:250 to 250:1 and particularly preferably in the range of from 1:75 to 75:1.

The herbicidal composition are suitable as herbicides. Accordingly, these herbicidal compositions control vegetation on non-crop areas very efficiently, especially at high rates of application. They act against broad-leafed weeds and grass weeds in crops such as wheat, rice, corn, soybeans and cotton without causing any significant damage to the crop plants. This effect is mainly observed at low rates of application.

The invention therefore also relates to method for controlling undesirable vegetation, which method comprises applying the herbicidal composition to a locus where undesirable vegetation is present or is expected to be present.

As used herein, the terms "controlling" and "combating" are synonyms.

As used herein, the terms "undesirable vegetation", "undesirable species", "undesirable plants", "harmful plants", "undesirable weeds", or "harmful weeds" are synonyms.

The term "locus", as used herein, means the area in which the vegetation or plants are growing or will grow, typically a field.

The herbicidal compositions according to the invention are applied to the plants mainly by spraying the leaves. Here, the application can be carried out using, for example, water as carrier by customary spraying techniques using spray liquor amounts of from about 100 to 1000 l/ha (for example from 300 to 400 l/ha). The herbicidal compositions may also be applied by the low-volume or the ultra-low-volume method, or in the form of microgranules. Application of the herbicidal compositions according to the present invention can be done before, during and/or after, preferably during and/or after, the emergence of the undesirable plants.

The herbicidal compositions according to the present invention can be applied pre- or post-emergence or together with the seed of a crop plant. It is also possible to apply the herbicidal composition by applying seed, pretreated with the herbicidal composition of the invention, of a crop plant. If the active compounds are less well tolerated by certain crop plants, application techniques may be used in which the herbicidal compositions are sprayed, with the aid of the spraying equipment, in such a way that as far as possible they do not come into contact with the leaves of the sensitive crop plants, while the active compounds reach the leaves of undesirable plants growing underneath, or the bare soil surface (post-directed, lay-by).

In a further embodiment, the herbicidal composition according to the invention can be applied by treating seed. The treatment of seed comprises essentially all procedures familiar to the person skilled in the art (seed dressing, seed coating, seed dusting, seed soaking, seed film coating, seed multilayer coating, seed encrusting, seed dripping and seed pelleting) based on the herbicidal compositions. Here, the herbicidal compositions can be applied diluted or undiluted. The term "seed" comprises seed of all types, such as, for example, corns, seeds, fruits, tubers, seedlings and similar forms. Here, preferably, the term seed describes corns and seeds. The seed used can be seed of the useful plants mentioned above, but also the seed of transgenic plants or plants obtained by customary breeding methods.

Moreover, it may be advantageous to apply the herbicidal compositions of the present invention on their own or jointly in combination with other crop protection agents, for example with agents for controlling pests or phytopathogenic fungi or bacteria or with groups of active compounds which regulate growth. Also of interest is the miscibility with mineral salt solutions which are employed for treating nutritional and trace element deficiencies. Nonphytotoxic oils and oil concentrates can also be added.

When employed in plant protection, the amounts of PPO-inhibitor without formulation auxiliaries, are, depending on the kind of effect desired, from 0.001 to 2 kg per ha, preferably from 0.005 to 2 kg per ha, more preferably from 0.05 to 0.9 kg per ha and in particular from 0.1 to 0.75 kg per ha.

In treatment of plant propagation materials such as seeds, e. g. by dusting, coating or drenching seed, amounts of PPO-inhibitor is of from 0.1 to 1000 g, preferably from 1 to 1000 g, more preferably from 1 to 100 g and most preferably from 5 to 100 g, per 100 kilogram of plant propagation material (preferably seeds) are generally required.

When used in the protection of materials or stored products, the amount of PPO-inhibitor depends on the kind of application area and on the desired effect. Amounts customarily applied in the protection of materials are 0.001 g to 2 kg, preferably 0.005 g to 1 kg, of agrochemical active ingredient per cubic meter of treated material.

In the methods of the present invention it is immaterial whether the PPO-inhibitor, the compound of formula (I), and optionally the amine component and/or the second agrochemical active ingredient are formulated and applied jointly or separately.

In the case of separate application it is of minor importance, in which order the application takes place. It is only necessary, that PPO-inhibitor, the compound of formula (I), optionally the amine component and/or optionally the second agrochemical active ingredient are applied in a time frame that allows simultaneous action of the active ingredients on the plants, preferably within a time-frame of at most 14 days, in particular at most 7 days.

The herbicidal compositions according to the invention can also be used in crops which have been modified by mutagenesis or genetic engineering in order to provide a new trait to a plant or to modify an already present trait, preferably a tolerance against PPO-inhibitors.

The term "crops" as used herein includes also (crop) plants which have been modified by mutagenesis or genetic engineering in order to provide a new trait to a plant or to modify an already present trait.

Mutagenesis includes techniques of random mutagenesis using X-rays or mutagenic chemicals, but also techniques of targeted mutagenesis, in order to create mutations at a specific locus of a plant genome. Targeted mutagenesis techniques frequently use oligonucleotides or proteins like CRISPR/Cas, zinc-finger nucleases, TALENs or meganucleases to achieve the targeting effect.

Genetic engineering usually uses recombinant DNA techniques to create modifications in a plant genome which under natural circumstances cannot readily be obtained by cross breeding, mutagenesis or natural recombination. Typically, one or more genes are integrated into the genome of a plant in order to add a trait or improve a trait. These integrated genes are also referred to as transgenes in the art, while plant comprising such transgenes are referred to as transgenic plants. The process of plant transformation usually produces several transformation events, which differ in the genomic locus in which a transgene has been integrated. Plants comprising a specific transgene on a specific genomic locus are usually described as comprising a specific "event", which is referred to by a specific event name. Traits which have been introduced in plants or have been modified include in particular herbicide tolerance, insect resistance, increased yield and tolerance to abiotic conditions, like drought.

Herbicide tolerance has been created by using mutagenesis as well as using genetic engineering. Plants which have been rendered tolerant to acetolactate synthase (ALS) inhibitor herbicides by conventional methods of mutagenesis and breeding comprise plant varieties commercially available under the name Clearfield®. However, most of the herbicide tolerance traits have been created via the use of transgenes.

Herbicide tolerance has been created to glyphosate, glufosinate, 2,4-D, dicamba, oxynil herbicides, like bromoxynil and ioxynil, sulfonylurea herbicides, ALS inhibitor herbicides and 4-hydroxyphenylpyruvate dioxygenase (HPPD) inhibitors, like isoxaflutole and mesotrione.

Transgenes which have been used to provide herbicide tolerance traits comprise: for tolerance to glyphosate: cp4 epsps, epsps grg23ace5, mepsps, 2mepsps, gat4601, gat4621 and goxv247, for tolerance to glufosinate: pat and bar, for tolerance to 2,4-D: aad-1 and aad-12, for tolerance to dicamba: dmo, for tolerance to oxynil herbicies: bxn, for tolerance to sulfonylurea herbicides: zm-hra, csr1-2, gm-hra, S4-HrA, for tolerance to ALS inhibitor herbicides: csr1-2, for tolerance to HPPD inhibitor herbicides: hppdPF, W336 and avhppd-03.

Transgenic corn events comprising herbicide tolerance genes are for example, but not excluding others, DAS40278, MON801, MON802, MON809, MON810, MON832, MON87411, MON87419, MON87427, MON88017, MON89034, NK603, GA21, MZHG0JG, HCEM485, VCO-Ø1981-5, 676, 678, 680, 33121, 4114, 59122, 98140, Bt10, Bt176, CBH-351, DBT418, DLL25, MS3, MS6, MZIR098, T25, TC1507 and TC6275.

Transgenic soybean events comprising herbicide tolerance genes are for example, but not excluding others, GTS 40-3-2, MON87705, MON87708, MON87712, MON87769, MON89788, A2704-12, A2704-21, A5547-127, A5547-35, DP356043, DAS44406-6, DAS68416-4, DAS-81419-2, GU262, SYHTØH2, W62, W98, FG72 and CV127.

Transgenic cotton events comprising herbicide tolerance genes are for example, but not excluding others, 19-51a, 31707, 42317, 81910, 281-24-236, 3006-210-23, BXN10211, BXN10215, BXN10222, BXN10224, MON1445, MON1698, MON88701, MON88913, GHB119, GHB614, LLCotton25, T303-3 and T304-40.

Transgenic canola events comprising herbicide tolerance genes are for example, but not excluding others, MON88302, HCR-1, HCN10, HCN28, HCN92, MS1, MS8, PHY14, PHY23, PHY35, PHY36, RF1, RF2 and RF3.

Insect resistance has mainly been created by transferring bacterial genes for insecticidal proteins to plants. Transgenes which have most frequently been used are toxin genes of *Bacillus* spec. and synthetic variants thereof, like cry1A, cry1Ab, cry1Ab-Ac, cry1Ac, cry1A.105, cry1F, cry1Fa2, cry2Ab2, cry2Ae, mcry3A, ecry3.1Ab, cry3Bb1, cry34Ab1, cry35Ab1, cry9C, vip3A(a), vip3Aa20. However, also genes of plant origin have been transferred to other plants. In particular genes coding for protease inhibitors, like CpTI and pinII. A further approach uses transgenes in order to produce double stranded RNA in plants to target and downregulate insect genes. An example for such a transgene is dvsnf7.

Transgenic corn events comprising genes for insecticidal proteins or double stranded RNA are for example, but not excluding others, Bt10, Bt11, Bt176, MON801, MON802, MON809, MON810, MON863, MON87411, MON88017, MON89034, 33121, 4114, 5307, 59122, TC1507, TC6275, CBH-351, MIR162, DBT418 and MZIR098.

Transgenic soybean events comprising genes for insecticidal proteins are for example, but not excluding others, MON87701, MON87751 and DAS-81419.

Transgenic cotton events comprising genes for insecticidal proteins are for example, but not excluding others, SGK321, MON531, MON757, MON1076, MON15985, 31707, 31803, 31807, 31808, 42317, BNLA-601, Event1, COT67B, COT102, T303-3, T304-40, GFM Cry1A, GK12, MLS 9124, 281-24-236, 3006-210-23, GHB119 and SGK321.

Increased yield has been created by increasing ear biomass using the transgene athb17, being present in corn event MON87403, or by enhancing photosynthesis using the transgene bbx32, being present in the soybean event MON87712.

Crops comprising a modified oil content have been created by using the transgenes: gm-fad2-1, Pj.D6D, Nc.Fad3, fad2-1A and fatb1-A. Soybean events comprising at least one of these genes are: 260-05, MON87705 and MON87769.

Tolerance to abiotic conditions, in particular to tolerance to drought, has been created by using the transgene cspB, comprised by the corn event MON87460 and by using the transgene Hahb-4, comprised by soybean event IND-ØØ41Ø-5.

Traits are frequently combined by combining genes in a transformation event or by combining different events during the breeding process. Preferred combination of traits are herbicide tolerance to different groups of herbicides, insect tolerance to different kind of insects, in particular tolerance to lepidopteran and coleopteran insects, herbicide tolerance with one or several types of insect resistance, herbicide tolerance with increased yield as well as a combination of herbicide tolerance and tolerance to abiotic conditions.

Plants comprising singular or stacked traits as well as the genes and events providing these traits are well known in the art. For example, detailed information as to the mutagenized or integrated genes and the respective events are available from websites of the organizations "International Service for the Acquisition of Agri-biotech Applications (ISAAA)" (http://www.isaaa.org/gmapprovaldatabase) and the "Center for Environmental Risk Assessment (CERA)" (http://cera-qmc.org/GMCropDatabase), as well as in patent applications, like EP3028573 and WO2017/011288.

The use of herbicidal compositions according to the invention on crops may result in effects which are specific to a crop comprising a certain gene or event. These effects might involve changes in growth behavior or changed resistance to biotic or abiotic stress factors. Such effects may in particular comprise enhanced yield, enhanced resistance or tolerance to insects, nematodes, fungal, bacterial, mycoplasma, viral or viroid pathogens as well as early vigour, early or delayed ripening, cold or heat tolerance as well as changed amino acid or fatty acid spectrum or content.

Furthermore, plants are also covered that contain by the use of recombinant DNA techniques a modified amount of ingredients or new ingredients, specifically to improve raw material production, e.g., potatoes that produce increased amounts of amylopectin (e.g. Amflora® potato, BASF SE, Germany).

The herbicidal compositions are generally applied to row crops and specialty crops. Examples of row crops include soybeans, corn, canola, cotton, cereals or rice, but as well sunflower, potato, dry bean, field pea, flax, safflower, buckwheat and sugar beets. Preferred crops for the application methods with herbicidal compositions are corn, soy, sunflower, rice, cereals and sugarcane.

Specialty crops are to be understood as fruits, vegetables or other specialty or plantation permanent crops such as trees, nuts, vines, (dried) fruits, ornamentals, oil palm, banana, rubber and the like, Horticulture and nursery crops, including floriculture, may also fall under the definition of specialty crops. Vegetable crops includes for example aubergine, beans, bell pepper, cabbage, chili, cucumber, eggplant, lettuce, melon, onion, potato, sweet potato, spinach and tomato. Plants being considered specialty crops are in general intensively cultivated. For weed control in vegetable crops, it may be desirable to shield the crops from contact with the spray solution that contains the herbicidal mixture according to the present invention.

In general, the crops which may be treated, may be of conventional origin or may be herbicide tolerant crops, preferably PPO-inhibitor tolerant crops. Typically, the PPO-inhibitor tolerant crop is tolerant against the PPO-inhibitor contained in the herbicidal composition. Preferred crops, which are tolerant to PPO-inhibitors, are selected from the group consisting of rice, sugarcane, sunflower, cereals (e.g. wheat, barley, sorghum, mullet, oats, rye, triticae), corn, soybean, canola and cotton, more preferably from soybean, corn, cotton, rice, sunflower, most preferably soybean.

In a preferred embodiment, the herbicidal composition is applied once, twice or three times per Gregorian calendar year, i.e. in one application, in two applications or in three applications per year according to the Gregorian calendar. In a preferred embodiment, the herbicidal composition is applied twice per Gregorian calendar year, i.e. in two applications per year according to the Gregorian calendar. In an alternatively preferred embodiment, the herbicidal composition is applied one time per Gregorian calendar year, i.e. in one application per year according to the Gregorian calendar. In a preferred embodiment, the herbicidal composition is applied one time in about 12 months, i.e. in one application in about 12 months. In an alternative preferred embodiment, the herbicidal composition is applied between one and ten times per Gregorian calendar year, i.e. in up to ten applications per year according to the Gregorian calendar. This alternative preferred method is of particular usefulness in permanent crops, in particular those grown under tropical conditions; in which case weeds grow vigorously at any time of the year, and herbicide applications are to be re-peated as soon as the previous treatment loses its effectiveness and weeds start to regrow.

The herbicidal compositions are preferably used in post-emergence applications.

The invention includes the use and methods of application of the herbicidal composition for controlling undesirable vegetation in crops, preferably in a burndown program. In one embodiment, the herbicidal composition is applied to a locus before the seeding of a desired crop plant but after the emergence of the undesired vegetation.

Therefore, the present invention also relates to a method for burndown treatment of undesirable vegetation in crops, comprising applying the herbicidal composition, to a locus where crops will be planted before planting (or seeding) or emergence of the crop. Herein, the herbicidal composition is applied undesirable vegetation or the locus thereof.

In burndown programs, the herbicidal composition(s) can be applied prior to seeding (planting) or after seeding (or planting) of the crop plants but before the emergence of the crop plants, in particular prior to seeding. The herbicidal compositions are preferably applied prior to seeding of the crop plants. For burndown, the herbicidal composition(s) will generally be applied a date up to 9 months, frequently up to 6 months, preferably up to 4 months prior to planting the crop. The burndown application can be done at a date up to 1 day prior to emergence of the crop plant and is preferably done at a date prior to seeding/planting of the crop plant, preferably at a date of at least one day, preferably at least 2 days and in particular at least one 4 days prior to planting or from 6 months to 1 day prior emergence, in particular from 4 months to 2 days prior emergence and more preferably from 4 months to 4 days prior emergence. It is, of course, possible to repeat the burndown application once or more, e.g. once, twice, three times, four times or five times within that time frame.

It is a particular benefit of the herbicidal compositions that they have a very good post-emergence herbicide activity, i.e. they show a good herbicidal activity against emerged undesirable plants. Thus, in a preferred embodiment of invention, the herbicidal compositions are applied post-emergence, i.e. during and/or after, the emergence of the undesirable plants. It is particularly advantageous to apply the herbicidal composition post emergent when the undesirable plant starts with leaf development up to flowering. The herbicidal compositions are particularly useful for controlling undesirable vegetation which has already developed to a state, which is difficult to control with conventional burndown mixtures, i.e. when the individual weed is taller than 10 cm (4 inches) or even taller than 15 cm (6 inches) and/or for heavy weed populations. In the case of a post-emergence treatment of the plants, the herbicidal compositions are preferably applied by foliar application.

The herbicidal compositions show a persistent herbicidal activity, even under difficult weathering conditions, which allows a more flexible application in burndown applications and minimizes the risk of weeds escaping. Apart from that, the herbicidal compositions show superior crop compatibility with certain conventional crop plants and with herbicide tolerant crop plants, i.e. their use in these crops leads to a reduced damage of the crop plants and/or does not result in increased damage of the crop plants. Thus, the herbicidal compositions can also be applied after the emergence of the crop plants. The herbicidal compositions may also show an accelerated action on harmful plants, i.e. they may affect damage of the harmful plants more quickly.

The herbicidal compositions are suitable for combating/controlling common harmful plants in fields, where useful plants shall be planted (i.e. in crops). The inventive mixtures are generally suitable, such as for burndown of undesired vegetation, in fields of the following crops: soybean, cotton, cereals (corn, rice, barley, wheat, maize, millet, etc.) canola, and sunflower, in particular soybean and cereals.

In another embodiment, the herbicidal composition is applied to a locus after the seeding of a desired crop plant, wherein the desired crop plant is tolerant to the PPO-inhibitor contained in the herbicidal composition, preferably wherein the undesired vegetation has already emerged.

Accordingly, the invention includes the use and methods of application of the herbicidal composition for controlling undesirable vegetation in crops in a burndown program, wherein the crop is produced by genetic engineering or by breeding, are resistant to one or more herbicides and/or pathogens such as plant-pathogenous fungi, and/or to attack by insects; preferably tolerant to PPO-inhibitors, and in particular to the PPO-inhibitor contained in the herbicidal composition.

Preferred are methods of application wherein the crop is produced by genetic engineering or by breeding, are tolerant to one or more herbicides and/or resistant to pathogens such as plant-pathogenous fungi, and/or to attack by insects; preferably tolerant to PPO-inhibitors as mentioned herein.

In crops such as soybean, cotton, oilseed rape, flax, lentils, rice, sugar beet, sunflower, tobacco and cereals, such as, for example maize or wheat, the herbicidal compositions are typically used against broad-leaved weeds and grass weeds and provide for less damage to the crop plants in comparison with conventional formulations of PPO-inhibitors. This effect is particularly observed at low application rates.

Depending on the application method in question, the herbicidal compositions can additionally be employed in a further number of crop plants to remove undesired plants.

Crops which are suitable are, for example, the following: *Allium cepa, Ananas comosus, Arachis hypogaea, Asparagus officinalis, Beta vulgaris* spec. *altissima, Beta vulgaris* spec. *rapa, Brassica napus* var. *napus, Brassica napus*, var. *napobrassica, Brassica rapa* var. *silvestris, Camellia sinensis, Carthamus tinctorius, Carya illinoinensis, Citrus limon, Citrus sinensis, Coffea arabica* (*Coffea canephora, Coffea liberica*), *Cucumis sativus, Cynodon dactylon, Daucus carota, Elaeis guineensis, Fragaria vesca, Glycine max, Gossypium hirsutum*, (*Gossypium arboreum, Gossypium herbaceum, Gossypium vitifolium*), *Helianthus annuus, Hevea brasiliensis, Hordeum vulgare, Humulus lupulus, Ipomoea batatas, Juglans regia, Lens culinaris, Linum usitatissimum, Lycopersicon lycopersicum, Malus* spec., *Manihot esculenta, Medicago sativa, Musa* spec., *Nicotiana tabacum* (*N. rustica*), *Olea europaea, Oryza sativa, Phaseolus lunatus, Phaseolus vulgaris, Picea abies, Pinus* spec., *Pisum sativum, Prunus armeniaca, Prunus avium, Prunus cerasus, Prunus dulcis, Prunus domesticua, Prunus persica, Pyrus communis, Ribes sylvestre, Ricinus communis, Saccharum officinarum, Secale cereale, Solanum tuberosum, Sorghum bicolor* (*S. vulgare*), *Theobroma cacao, Trifolium pratense, Triticum aestivum, Triticum durum, Vicia faba, Vitis vinifera* and *Zea mays*.

Moreover, it has been found that the herbicidal compositions are also suitable for the defoliation and desiccation of plant parts, for which crops plants such as cotton, potato, oilseed rape, sunflower, soybean or field beans, in particular cotton, are suitable.

As desiccants, the herbicidal compositions are particularly suitable for desiccating the aerial parts of crop plants such as potato, oilseed rape, sunflower, oil palm, and soybean. This makes possible the fully mechanical harvesting of these important crop plants. Also of economic interest is to facilitate harvesting, which is made possible by concentrating within a certain period of time the dehiscence, or reduction of adhesion to the tree, in citrus fruit, olives or other species and varieties of pome fruit, stone fruit and nuts. The same mechanism, i.e. the promotion of the development of abscission tissue between fruit part or leaf part and shoot part of the plants is also essential for the controlled defoliation of useful plants, in particular cotton. Moreover, a shortening of the time interval within which the individual cotton plants mature leads to an increased fiber quality after harvesting.

Moreover, it has been found that the herbicidal compositions of the invention are also suitable for the control of conifers, in particular of conifer seedlings which grow naturally, and specifically for the control of pine seedlings which grow naturally.

The herbicidal compositions have an outstanding herbicidal activity against a broad spectrum of economically important harmful monocotyledonous and dicotyledonous harmful plants. Also here, post-emergence application is preferred.

Specifically, examples may be mentioned of some representatives of the monocotyledonous and dicotyledonous weed flora which can be controlled by the combinations according to the invention, without the enumeration being a restriction to certain species.

Examples of monocotyledonous harmful plants on which the herbicidal compositions act efficiently are selected from *Cenchrus pauciflorus, Chloris* spp. (e.g. *Chloris virgata*), *Commelina erecta, Cynodon dactylon, Cyperus* spp, *Sor-*

*ghum halepense, Trichloris crinita, Zea mays* (Volunteer), *Cenchrus echinatus, Commelina benghalensis, Pennisetum americanum, Digitaria* spp (e.g. *Digitaria insularis, Digitaria sanguinalis, Digitaria horizontalis, Digitaria nuda*), *Panicum* spp (e.g. *Panicum maximum, Panicum dichotomiflorum, Panicum fasciculatum*), *Eleusine indica, Lolium* spp (e.g. *Lolium multiflorum*), *Urochloa* or *Brachiaria* spp. (e.g. *Urochloa* or *Brachiaria platyphylla, Urochloa* or *Brachiaria plantaginea, Urochloa* or *Brachiaria plantaginea* (Link) R. D. Webster, *Urochloa* or *Brachiaria decumbens*), *Dactyloctenium aegyptium, Commelina communis, Rottboellia cochinchinensis, Setaria* spp. (e.g. *Setaria viridis, Setaria faberi, Setaria verticillata, Setaria glauca* or *pumila*) *Elymus repens, Leptochloa* spp (e.g. *Leptochloa filiformis, Leptochloa fascicularis, Leptochloa chinensis, Leptochloa panicoides*), *Echinochloa* spp. (e.g. *Echinochloa colona, Echinochloa oryzicola, Echinochloa crus-pavonis, Echinochloa crus-galli, Echinochloa crus-pavonis* (Kunth) J. A. Schultes, *Echinchloa walteri* (Pursh) Heller, *Echinochloa colonum*), *Leersia japonica, Ischaemum rogusum, Oryza sativa, Leerisa hexandra, Oryza latifolia, Hordeum spontaneum, Rottboellia exaltata, Luziola subintegra, Paspalum* spp. (e.g. *Paspalum distichum*), *Oryza rufipogon, Alopecurus japonicus* Steud, *Alopecurus aequalis* Sobol, *Alopecurus myosuroides, Apera spica-venti, Avena* spp, (e.g. *Avena fatua* L., *Avena sterillis, Avena strigose*), *Aegilops tauschii* Coss, *Aegilops cylindrica, Sclerochloa kengiana* (Ohwi) Tzvel., *Beckmannia syzigachne* (Steud.) Fernald, *Lolium multiflorum* Lam, *Poa trivialis* L., *Ploypogon fugax*. N., *Phleum paniculatum, Puccinellia distans, Lolium rigidum, Urochloa panicoides, Bromus* spp. (e.g. *Bromus sterilis, Bromus japonicus* Thunb, *Bromus tectorum*) *Hordeum leporinum, Phalaris* spp. (e.g. *Phalaris minor, Phalaris brachystachys, Phalaris persicaria*), *Poa annua, Agrostis alba, Agropyron repens, Lolium perenne, Phragmites australia, Imperata cylindrica, Poa* spp, *Lolium persicum, Hordeum jubatum, Secale cereale, Rotboellia conchrinchinensis* (Lour.) W. D. Clayton, *Urochloa ramosa* (L.) Nguyen, *Murdannia nudiflora* (L.) Brenan, *Sorghum almum, Pennisetum purpureum, Echnichloa colonum, Ixophorus unisetus, Commelina diffusa.*

In a preferred embodiment, the herbicidal compositions are used to control monocotyledonous harmful plant species, more preferably *Zea mays* (Volunteer), *Cenchrus echinatus, Avena strigose, Pennisetum americanum, Panicum maximum, Digitaria* spp (e.g. *Digitaria insularis, Digitaria horizontalis, Digitaria nuda*), *Eleusine indica, Lolium* spp. (e.g. *Lolium multiflorum*), *Urochloa* or *Brachiaria* spp. (e.g. *Urochloa* or *Brachiaria plantaginea, Urochloa* or *Brachiaria plantaginea* (Link) R. D. Webster, *Urochloa* or *Brachiaria decumbens*), *Ischaemum rogusum, Oryza sativa, Echinochloa colona, Leerisa hexandra, Leptochloa* spp. (e.g. *Leptochloa panicoides*), *Rottboellia cochichinensis* or *exaltata, Avena* spp. (e.g. *Avena fatua* L), *Lolium* spp. (e.g. *Lolium multiflorum* Lam), *Cynodon dactylon* (L.) Pers., and *Chloris* spp.

Examples of dicotyledonous harmful plants on which the herbicidal compositions act efficiently are selected *Amaranthus* spp. (e.g. *Amaranthus palmeri, Amaranthus hybridus, Amaranthus spinosus, Amaranthus lividus, Amaranthus tuberculatus/rudis, Amaranthus quitensis, Amaranthus retroflexus*), *Chenopodium* spp. (e.g. *Chenopodium album, Chenopodium quinoa, Chenopodium serotinum, Ambrosia artemisiifolia, Ambrosia trifida, Kochia scoparia, Conyza canadensis, Helianthus annuus, Helianthus theophrasti, Borreria* spp. (e.g. *Borreria verticillata*), *Brassica rapa, Carduus acanthoides, Malva neglecta, Parietaria debilis, Portulaca oleracea, Raphanus* spp. (e.g. *Raphanus raphanistrum, Raphanus sativus* L. var *sativus*), *Conyza bonariensis, Ipomoea* spp. (e.g. *Ipomoea grandifolia, Ipomoea indivisa, Ipomoea hederacea, Ipomoea lacunosa, Ipomoea wrightii, Ipomoea lonchophylla*), *Bidens pilosa, Senna obtusifolia, Sida* spp. (e.g. *Sida rhombifolia, Sida spinosa* L.), *Spermacoce latifolia, Tridax procumbens, Parthenium hysterophorus, Acalypha australis, Sinapsis arvensis, Ammi majus, Atriplex* spp. (e.g. *Atriplex patula*), *Matricaria* spp. (e.g. *Matricaria inodora, Matricaria chamomilla*), *Galinsoga* spp, *Orobanche* spp, *Papaver rhoeas, Mercurialis annua, Convolvulus arvensis, Cirsium arvense, Calystegia sepium, Stellaria media, Galium aparine, Lamium* spp. (e.g. *Lamium amplexicaule*), *Viola* spp. (e.g. *Viola arvensis*), *Datura stramonium, Xanthium* spp., *Celosia argentea, Melampodium divaricatum, Cleome viscosa, Molugo verticilatus, Borhevia erecta, Gomphrena* spp., *Nicandra physalodes, Ricinus communis, Monochoria vaginalis, Eichhornia crassipes, Linderina pyxidaria* L., *Lindernia dubia, Rotala indica, Eclipta prostrata, Bidens frondosa, Aneilema keisak, Sagittaria pygmaea* Miq., *Sagittaria trifolia* L., *Potamogeton distinc, Alisma canaliculatum, Sphenoclea zeylanica, Jussiaea* spp., *Monochoria hastata, Heteranthera limosa, Ammannia* spp. (e.g. *Ammannia coccinea*), *Alisma plantago-aquatica, Sagittaria montevidensis, Echinodorus grandiflorus, Aeschynomene* spp. (e.g. *Aeschynomene rudis, Aeschynomene denticulata, Aeschynomene indica*), *Eclipta alba, Ludwigia* spp. (e.g. *Ludwigia octovallis*), *Caperonia palustris, Murdannia nudiflora, Limnocharis flava, Pistia stratiotes, Rotala ramosior, Sesbania herbacea, Macroptilium lathyroides, Macropthilium lathyroides, Cyperus odoratus, Alternanthera philoxeroides, Alternanthera tenella, Bacopa rotundifolia, Caperonia castaneifolia, Eleocharis* spp., *Lindernia pyxidaria, Physalis* spp., *Sagittaria sagittifolia, Sesbania exaltata, Galium aparine* L, *Descuminia sophia* (L.), *Capsella bursa-pastoris*(L.) Medic, *Stellaria media* (Linn.), *Malachium aquaticum* (L.), *Sonchus* spp. (e.g. *Sonchus oleraceus, Sonchus arvensis, Sonchus asper*), *Polygonum* spp. (e.g. *Polygonum persicaria, Polygonum convolvulus, Polygonum aviculare, Polygonum pensylvanicum*), *Fallopia convulvulus, Eigerone bonariensis, Rumex dentatus, Corynopus didymus, Melilotus* sp, *Midicago sativus, Malwa parviflora, Anagallis arvensis, Capsella media, Rorippa islandica, Rumex obtusifolius, Glycine max, Sisymbrium* spp. (e.g. *Sisymbrium officinale*), *Silene gallica, Spergula arvensis, Anthemis cotula, Anthemis arvensis, Crepis capillaris Litospermum arvense, Cephalanoplos segetum, Geranium* spp. (e.g. *Geranium donianum* Sweet., *Geranium pusillum, Geranium dissectum*), *Leucas chinensis, Arenaria serpyllifolia, Anacamtodon fortunei* Mitt., *Solanum* spp. (e.g. *Solanum nigrum*), *Trianthema* spp. (e.g. *Trianthema portulacastrum*), *Euphorbia* spp. (e.g. *Euphorbia hirta, Euphorbia helioscopia* Linn, *Euphorbia dentata, Euphorbia heterophylla*), *Vicia sativa, Lathyrus aphaca, Asphodelus tenuifolius, Brassica kaber, Argemone mexicana, Launea mudicaulis, Centaurea cyanus, Sinapis arvensis, Tripleurospermum inodorum, Senecio vulgaris, Salsola tragus, Lactuca serriola, Brassica napus, Thlaspi arvense, Crepis tectorum, Myosotis arvensis, Equisetum arvense, Descurainia pinnata, Veronica* spp. (e.g., *Veronica persica, Veronica polita* Fries), *Mucuna* spp., *Momordica charantia, Merremia aegyptia, Commelina benghalensis Kallstroemia maxima, Croton lobatus, Melampodium divaricatum, Oxalis neaei, Richardia scabra, Phylanthus* sp, *Sicyos polyacanthus.*

Preferred examples of dicotyledonous harmful plants on which the herbicidal compositions act efficiently are *Ipomoea* spp. (e.g. *Ipomoea grandifolia*), *Mucuna* spp, *Ricunus communis, Mormordica charantia, Merremia aegyptia, Senna obtusifolia, Commelina benghalensis, Amaranthus* spp. (e.g. *Amaranthus quitensis*), *Conyza bonariensis, Bidens pilosa, Euphorbia heterophylla, Sida* spp, *Spermacoce latifolia, Tridax procumbens, Borreria verticillata, Sagittaria motevidensis, Lidwigia octovallis, Aeschynomene rudis, Echinodorus grandiflorus, Alternanthera philoxeroides, Raphanus raphanistrum, Glycine max, Raphanus sativus* L. var *sativus.*

Herbicidal compositions are also suitable for controlling a large number of annual and perennial sedge weeds including *Cyperus esculentus, Cyperus rotundus, Cyperus odoratus, Cyperus flavus, Cyperus iria, Cyperus ferax, Eleocharis acicularis, Cyperus* spp., *Scirpus* or *Bolboschoenus maritimus, Scirpus* or *Schoenoplectus mucronatus, Cyperus difformis* L., *Scirpus juncoides* Roxb, *Cyperus serotinus* Rottb., *Eleocharis kuroguwai, Scirpus juncoides, Cyperus iria, Fimbristylis miliacea, Scirpus grossus, Cyperus ferax, Cyperus lanceolatus, Fimbristylis dichotoma, Scirpus planiculmis* Fr. Schmidt, *Cyperus odoratus*, and *Cyperus difformis.*

Preferred examples of sedge weeds on which the herbicidal compositions act efficiently are *Cyperus* spp, *Cyperus difformus* L., *Cyperus iria, Cyperus ferax, Cyperus esulentus*, and *Cyperus lanceolatus.*

If the herbicidal compositions are applied post-emergence to the green parts of the plants, growth likewise stops drastically a very short time after the treatment and the weed plants remain at the growth stage of the point of time of application, or they die completely after a certain time, so that in this manner competition by the weeds, which is harmful to the crops, is eliminated at a very early point in time and in a sustained manner.

The herbicidal compositions are characterized by a rapidly commencing and long-lasting herbicidal action. As a rule, the rainfastness of the active compounds in the herbicide combinations according to the present invention is advantageous. In particular when the herbicidal compositions are employed application rates may be reduced, a broader spectrum of broad-leaved weeds and grass weeds maybe controlled, the herbicidal action may take place more rapidly, the duration of action may be longer, the harmful plants may be controlled better while using only one, or few, applications, and the application period which is possible to be extended.

The abovementioned properties and advantages are of benefit for weed control practice to keep agricultural crops free from undesired competing plants and thus to safeguard and/or increase the yields from the qualitative and/or quantitative point of view. These herbicidal compositions markedly exceed the technical state of the art with a view to the properties described.

Owing to their herbicidal and plant-growth-regulatory properties, the herbicidal compositions can be employed for controlling harmful plants in genetically modified crops or crops obtained by mutation/selection. These crops are distinguished as a rule by particular, advantageous properties, such as resistances to herbicidal compositions or resistances to plant diseases or causative agents of plant diseases such as particular insects or microorganisms such as fungi, bacteria or viruses. Other particular properties relate, for example, to the harvested material with regard to quantity, quality, storability, composition and specific constituents. Thus, for example, transgenic plants are known whose starch content is increased or whose starch quality is altered, or those where the harvested material has a different fatty acid composition.

The present invention also relates to a method of controlling undesired vegetation (e.g. harmful plants), which comprises applying the herbicidal compositions, preferably by the post-emergence method, to harmful or undesired plants, parts of said harmful or undesired plants, or the area where the harmful or undesired plants grow, for example the area under cultivation.

In the context of the present invention "controlling" denotes a significant reduction of the growth of the harmful plant(s) in comparison to the untreated harmful plants. Preferably, the growth of the harmful plant(s) is essentially diminished (60-79%), more preferably the growth of the harmful plant(s) is largely or fully suppressed (80-100%), and in particular the growth of the harmful plant(s) is almost fully or fully suppressed (90-100%).

Thus, in a further aspect, the present invention relates to a method for controlling undesired plant growth, and/or controlling harmful plants, comprising the step of applying the herbicidal composition (preferably in one of the preferred embodiments defined herein) onto the undesired plants or the harmful plants, on parts of the undesired plants or the harmful plants, or on the area where the undesired plants or the harmful plants grow.

The herbicidal compositions are also suitable for controlling weeds that are resistant to commonly used herbicides such as, for example, weeds that are resistant to glyphosate, weeds that are resistant to auxin inhibitor herbicides such as e. g. 2,4-D or dicamba, weeds that are resistant to photosynthesis inhibitors such as e. g. atrazine, weeds that are resistant to ALS inhibitors such as e. g. sulfonylureas, imidazolinones or triazolopyrimidines, weeds that are resistant to ACCase inhibitors such as e. g. clodinafop, clethodim or pinoxaden or weeds that are resistant to protoporphyrinogen-IX-oxidase inhibitors such as e. g. sulfentrazone, flumioxazine, fomesafen or acifluorfen, for example the weeds that are listed in the International Survey of Resistant Weeds (http://www.weedscience.org/Summary/SpeciesbySOATable.aspx), preferably weeds that are resistant to PPO-inhibitors.

Accordingly, the present invention also provides a method for controlling the growth of PPO resistant weeds, which comprises contacting such weeds, parts of it, its propagation material or its habitat with the herbicidal composition wherein the PPO resistant weeds are weeds, that are resistant to PPO-inhibiting herbicides and compositions containing them, except for the herbicidal composition.

The invention particularly relates to a method for controlling PPO resistant weeds in crops which comprises applying the herbicidal composition to crops, where said PPO herbicide resistant weeds occur or might occur.

The term "PPO resistant weed" refer to a plant that, in relation to a treatment with an appropriate or over-appropriate rate of PPO-inhibiting herbicide application, has inherited, developed or acquired an ability 1) to survive that treatment, if it is one that is lethal to (i.e. eradicates) the wild type weed; or 2) to exhibit significant vegetative growth or thrive after that treatment, if it is one that suppresses growth of the wild-type weed.

Effective weed control is defined as at least 70% weed suppression or eradication from the crop, or as at least 70% weed plant phototoxicity, as determined 2 weeks after treatment.

Thus, PPO resistant weeds are weeds, which are not controlled by the application of PPO inhibitors or compositions containing them except for the herbicidal composition, whereas the respective sensitive biotype is controlled at that use rate.

Here, "not controlled" means that in a visual rating the weed control (herbicidal effect) is <70% of weed suppression or eradication as determined 2 weeks after treatment; and "controlled" means that in a visual rating the weed control is >90% of weed suppression or eradication as determined 2 weeks after treatment.

Preferably, PPO resistant weeds are weeds, which are not controlled (i.e. in a visual rating the weed control is <70% of weed suppression or eradication as determined 2 weeks after treatment) by the application of PPO-inhibiting herbicides or compositions containing them except for the herbicidal composition.

Also preferably, PPO resistant weeds are weeds, which are not controlled (i.e. in a visual rating the weed control is <70% of weed suppression or eradication as determined 2 weeks after treatment) by the application rate of 200 g/ha or lower, particularly preferred 100 g/ha or lower, especially preferred 50 to 200 g/ha, more preferred 50 to 100 g/ha, of PPO-inhibiting herbicides or compositions containing them except the herbicidal composition, whereas the respective sensitive biotype is controlled (i.e. in a visual rating the weed control is >90% of weed suppression or eradication as determined 2 weeks after treatment) at that use rate.

Also preferably PPO-resistant weeds are those classified as being "PPO resistant" and thus listed according to Anonymous: List of herbicide resistant weeds by herbicide mode of action—weeds resistant to PPO-inhibitors (URL: http://www.weedscience.org/summary/MOA.aspx).

Particularly preferred the PPO resistant weeds are selected from the group consisting of *Acalypha* ssp., *Amaranthus* ssp., *Ambrosia* ssp., *Avena* ssp., *Conyza* ssp., *Descurainia* ssp., *Eleusine* spp., *Euphorbia* ssp., *Lolium* spp., and *Senecio* ssp.; especially preferred *Amaranthus* ssp., *Ambrosia* ssp. and *Euphorbia* ssp.; more preferred *Amaranthus* ssp. and *Ambrosia* ssp.

The herbicidal compositions are particularly useful to combat PPO-resistant weeds that are resistant to PPO-inhibitors in general, such as *Acalypha austrails, Amaranthus hybridus, Amaranthus palmeri, Amaranthus retroflexus, Amaranthus tuberculatus, Ambrosia artemisifolia, Avena fatua, Conyza sumatrensis, Descurainia sophia, Eleusine indica, Euphorbia heterophylia, Lolium rigidum*, and *Senecio vernalis.*

Also particularly preferred the PPO resistant weeds are selected from the group consisting of Asian copperleaf *Amaranthus rudis, Conyza ambigua, Conyza Canadensis, Descurainia sophia.*

Most PPO resistant weeds, in particular the biotypes of *Amaranthus tuberculatus*, are resistant due to a codon deletion on the nuclear-encoded gene PPX2L that codes for the PPO enzyme which is dual-targeted to the mitochondria and the chloroplasts. This results in a loss of the glycine amino acid in position 210 (see e.g. B. G. Young et al, Characterization of PPO-Inhibitor-Resistant Waterhemp (*Amaranthus tuberculatus*) Response to Soil-Applied PPO-Inhibiting Herbicides, Weed Science 2015, 63, 511-521).

A second type of mutation, in particular in a resistant biotype of *Ambrosia artemisiifolia*, was identified as a mutation that expressed a R98L change of the PPX2 enzyme (S. L. Rousonelos, R. M. Lee, M. S. Moreira, M. J. VanGessel, P. J. Tranel, Characterization of a Common Ragweed (*Ambrosia artemisiifolia*) Population Resistant to ALS- and PPO-Inhibiting Herbicides, Weed Science 60, 2012, 335-344.).

Accordingly, preferably PPO-resistant weeds are weeds whose Protox enzyme is resistant to the application of PPO inhibitors due to a mutation that is expressed as a ΔG210 or R98L change of said Protox enzyme or equivalents to the PPX2L or PPX2 respectively, in particular that is expressed as a ΔG210 or R98L change of said Protox enzyme.

The herbicidal compositions are useful for combating undesired vegetation. For this purpose, the herbicidal compositions may be applied as such or are preferably applied after dilution with water. Preferably, for various purposes of end user application, a so-called aqueous spray-liquor is prepared by diluting the compositions of the present invention with water, e.g. tap water. The spray-liquors may also comprise further constituents in dissolved, emulsified or suspended form, for example fertilizers, active substances of other groups of herbicidal or growth-regulatory active substances, further active substances, for example active substances for controlling animal pests or phytopathogenic fungi or bacteria, furthermore mineral salts which are employed for alleviating nutritional and trace element deficiencies, and nonphytotoxic oils or oil concentrates. As a rule, these constituents are added to the spray mixture before, during or after dilution of the herbicidal compositions according to the invention. The compositions of the invention can be applied by the pre-emergence or the post-emergence method. If the PPO-inhibitor is less well tolerated by certain crop plants, application techniques may be employed where the herbicidal compositions are sprayed, with the aid of the spraying apparatus, in such a way that the leaves of the sensitive crop plants ideally do not come into contact with them, while the active substances reach the leaves of undesired plants which grow underneath, or the bare soil surface (post-directed, lay-by).

Depending on the aim of the control measures, the season, the target plants and the growth stage, the compositions of the invention are applied to such a degree that the application rates of the PPO-inhibitor are from 0.001 to 3.0, preferably from 0.01 to 1.0 kg/ha.

The invention finally relates to a method for increasing the herbicidal effect of a PPO-inhibitor comprising the step of contacting the PPO-inhibitor with a compound of formula (I); and to the use of a compound of formula (I) for increasing the herbicidal effect of a PPO inhibitor.

The term "increasing the herbicidal effect" relates to an increased controlling of undesired vegetation as defined above. The increased herbicidal effect will typically be measured by comparison with a liquid herbicidal composition that does contains solvent that constitutes the continuous phase instead, but is identical otherwise. The increase is typically at least 10%, preferably at least 25%, most preferably 50%. The contacting in the method of application usually refers to admixing the amine component to the composition.

Advantages: the herbicidal compositions have an enhanced biological effect on undesired vegetation as compared to other formulations of PPO-inhibitors. Another advantage is the possibility to add a high concentration of the adjuvant compounds of formula (I) to the liquid composition with reduced impact on formulation stability by phase separation, gelling, and inhomogeneities. The stability and flowability of the herbicidal composition is further improved by adding an amine component as described above. Another advantage is the reduced damage of certain crop plants by the herbicidal composition, and a defoliation effect on other crop plants. Further advantages are a higher loading with PPO-inhibitors, and lower application rates.

The following examples illustrate the invention.

Ingredients:

Pesticide A: saflufenacil

Pesticide B: trifludimoxazin

Pesticide C: tiafenacil

Pesticide D: ethyl [3-[2-chloro-4-fluoro-5-(1-methyl-6-trifluoromethyl-2,4-dioxo-1,2,3,4-tetrahydropyrimidin-3-yl) phenoxy]-2-pyridyloxy]acetate (CAS 353292-31-6; S-3100; epyrifenacil)

Pesticide E: 2-[[3-[[3-chloro-6-[3,6-dihydro-3-methyl-2,6-dioxo-4-(trifluoromethyl)-1(2H)pyrimidinyl]-5-fluoro-2-pyridinyl]oxy]-2-pyridinyl]oxy]-aceticacid methyl ester (CAS 2158275-73-9)

Pesticide F: 2-[[3-[[3-chloro-6-[3,6-dihydro-3-methyl-2,6-dioxo-4-(trifluoromethyl)-1(2H)pyrimidinyl]-5-fluoro-2-pyridinyl]oxy]-2-pyridinyl]oxy] acetic acid ethyl ester (CAS 2158274-56-5)

Pesticide G: 2-[[3-[[3-chloro-6-[3,6-dihydro-3-methyl-2,6-dioxo-4-(trifluoromethyl)-1(2H)pyrimidinyl]-5-fluoro-2-pyridinyl]oxy]-2-pyridinyl]oxy]-N-(methylsulfonyl)-acetamide (CAS 2158276-22-1)

Pesticide H: 2-[2-[[3-chloro-6-[3,6-dihydro-3-methyl-2,6-dioxo-4-(trifluoromethyl)-1(2H)pyrimidinyl]-5-fluoro-2-pyridinyl]oxy]phenoxy] acetic acid ethyl ester (CAS 2158274-50-9)

Pesticide J: ethyl 2-[[3-[2-chloro-5-[4-(difluoromethyl)-3-methyl-5-oxo-1,2,4-triazol-1-yl]-4-fluoro-phenoxy]-2-pyridyl]oxy]acetate (CAS 2230679-62-4)

Pesticide K: sulfentrazone

Pesticide L: carfentrazone-ethyl

Pesticide M: flumioxazin

Pesticide N: oxyfluorfen

Pesticide P: lactofen

Adjuvant A: aluminum magnesium silicate, hydrated

Additive A: laurylethersulfate containing two molecules of polymerized ethylene oxide, diethanolammonium salt, 77 wt % in propylene glycol Additive B: laurylethersulfate containing approximately two molecules of polymerized ethylene oxide, monoisopropanol ammonium salt, 85 wt % in propylene glycol Additive C: laurylethersulfate containing approximately two molecules of polymerized ethylene oxide, ethanolammonium salt, 82 wt % in dipropylene glycol.

Additive D: DASH, available from BASF SE

Additive E: laurylethersulfate containing approximately two molecules of polymerized ethylene oxide, sodium salt, 70 wt % in water.

Additive F: laurylethersulfate containing approximately two molecules of polymerized ethylene oxide, ethanolammonium salt, 77 wt % in dipropylene glycol.

Additive G: laurylethersulfate containing approximately two molecules of polymerized ethylene oxide, ammonium salt, 70 wt % in water.

EXAMPLE-1: PREPARATION OF HERBICIDAL COMPOSITIONS

Six compositions A1 to A6 were prepared with the ingredients at the concentrations as provided in Table A. To prepare oil dispersions, ingredients were mixed and the resulting compositions were grinded to a mean particle size of 2 μm, upon which Adjuvant A was added and the compositions were mixed until homogenous.

TABLE A

Ingredients of compositions A1, A2, A3, A4, A5 and A6 in [g/l].

| Ingredient [wt %] | A1 | A2 | A3 | A4 | A5 | A6 |
|---|---|---|---|---|---|---|
| Pesticide A | 10 | 10 | 10 | 10 | — | — |
| Pesticide B | — | — | — | — | 10 | 10 |
| Adjuvant A | 1.0 | 1.0 | 1.0 | 1.0 | 1.0 | 1.0 |
| Additive A | 66.7 | — | — | — | 60.0 | — |
| Additive B | — | 62.6 | 60.4 | — | — | 60.0 |
| Additive C | | | | 60.4 | | |
| Propylene glycol | — | 26.4 | — | — | — | — |
| Dipropylene glycol | 22.3 | — | 28.6 | 28.6 | 29.0 | 29.0 |
| Apparent dynamic viscosity [mPas] | 602 | 403 | 465 | 518 | 543 | 468 |

Visual inspection of the compositions showed that compositions A1, A2, A3, A4, A5 and H6 had formed free flowing white oil dispersions.

EXAMPLE-2: BIOLOGICAL EFFICACY AND PHYTOTOXICITY

The selectivity and herbicidal activity of different liquid herbicidal compositions according to Tables D to CC combining various Pesticides and Additives were assessed by the following greenhouse experiments. The culture containers used were plastic flowerpots containing loamy sand with approximately 3.0% of humus as the substrate. The seeds of the test plants were sown separately for each species. For the post-emergence treatment, the test plants were first grown to a height of 3 to 15 cm, depending on the plant habit, and only then treated with the active ingredients which had been suspended or emulsified in water. For this purpose, the test plants were either sown directly and grown in the same containers, or they were first grown separately as seedlings and transplanted into the test containers a few days prior to treatment. Depending on the species, the plants were kept at 10-25° C. or 20-35° C., respectively. The test period extended over 6-7 days. During this time, the plants were tended, and their response to the individual treatments was evaluated. Evaluation was carried out using a scale from 0 to 100. 100 means no emergence of the plants, or complete destruction of at least the aerial moieties, and 0 means no damage, or normal course of growth. The plants used in the greenhouse experiments were of the following species in Tables B and C. The results of the assessment of herbicidal damage is summarized in Tables D to CC.

TABLE B crops plants tested for herbicidal effect

| Abbreviation | Scientific name |
|---|---|
| ZEAMX | *Zea mays* |
| ORYSA | *Oryza sativa* |
| GLXMA | *Glycine max* |

TABLE C unwanted vegetation tested for herbicidal effect

| Abbreviation | Scientific name |
|---|---|
| ECHCG | *Echinochloa crus-galli* |
| BRADC | *Brachiaria decumbens* |
| SETFA | *Setaria faberi* |
| DIGSA | *Digitaria sanguinalis* |
| LOLMU | *Lolium multiflorum* |
| AVEFA | *Avena fatua* |
| LEFFI | *Leptochloa filiformis* |

TABLE C-continued

| unwanted vegetation tested for herbicidal effect | |
|---|---|
| Abbreviation | Scientific name |
| ERICA | *Erigeron canadensis* |
| KCHSC | *Kochia scoparia* |
| ABUTH | *Abutilon theophrasti* |
| AMATA | *Amaranthus rudis* |
| AMARE | *Amaranthus retroflexus* |
| IPOHE | *Ipomoea hederacea* |
| COMBE | *Commelina benghalensis* |
| AMBEL | *Ambrosia elatior* |
| CHEAL | *Chenopodium album* |

TABLE D

Herbicidal effect of Pesticide A in combination with Additive D or E

| Pesticide + Additive | g/ha | ZEAMX | ECHCG | SORHA | SETVI | KCHSC | AMATA | IPOHE |
|---|---|---|---|---|---|---|---|---|
| A + D | 16 + 500 | 85 | 95 | 80 | 98 | 95 | 98 | 98 |
| A + E | 16 + 500 | 25 | 95 | 95 | 98 | 98 | 98 | 98 |

TABLE E

Herbicidal effect of Pesticide A in combination with Additive D or F

| Pesticide + Additive | g/ha | ZEAMX | BRADC | ERICA | KCHSC | ABUTH | AMARE | IPOHE |
|---|---|---|---|---|---|---|---|---|
| A + D | 25 + 500 | 90 | 75 | 95 | 98 | 98 | 95 | 98 |
| A + F | 25 + 500 | 40 | 80 | 95 | 98 | 98 | 98 | 98 |

TABLE F

Herbicidal effect of Pesticide A in combination with Additive D, E, F, or G

| Pesticide + Additive | g/ha | ZEAMX | COMBE | ABUTH |
|---|---|---|---|---|
| A + D | 2 + 1000 | 25 | 60 | 70 |
| A + E | 2 + 1000 | 20 | 85 | 75 |
| A + F | 2 + 1000 | 15 | 90 | 90 |
| A + G | 2 + 1000 | 20 | 95 | 95 |

TABLE G

Herbicidal effect of Pesticide C in combination with Additive D, E, or F

| Pesticide + Additive | g/ha | ZEAMX | AVEFA | SETFA | AMARE | AMBEL | IPOHE |
|---|---|---|---|---|---|---|---|
| C + D | 2 + 1000 | 70 | 65 | 25 | 90 | 95 | 98 |
| C + E | 2 + 1000 | 35 | 75 | 60 | 90 | 95 | 98 |
| C + F | 2 + 1000 | 30 | 75 | 50 | 90 | 95 | 98 |

TABLE H

Herbicidal effect of Pesticide D in combination with Additive D or E

| Pesticide + Additive | g/ha | ORYSA | LEFFI |
|---|---|---|---|
| D + D | 2 + 1000 | 30 | 75 |
| D + E | 2 + 1000 | 25 | 90 |

TABLE J

| Herbicidal effect of Pesticide D in combination with Additive D or F | | | | | | | | |
|---|---|---|---|---|---|---|---|---|
| Pesticide + Additive | g/ha | ZEAMX | BRADC | KCHSC | CHEAL | AMATA | AMBEL | IPOHE |
| D + D | 2 + 1000 | 90 | 75 | 98 | 95 | 98 | 95 | 98 |
| D + F | 2 + 1000 | 70 | 85 | 98 | 95 | 98 | 95 | 98 |

TABLE K

| Herbicidal effect of Pesticide D in combination with Additive D, E, F, or G | | | | | | |
|---|---|---|---|---|---|---|
| Pesticide + Additive | g/ha | ZEAMX | ECHCG | COMBE | ABUTH | IPOHE |
| D + D | 1 + 500 | 70 | 65 | 95 | 98 | 98 |
| D + E | 1 + 500 | 25 | 85 | 95 | 98 | 98 |
| D + F | 1 + 500 | 25 | 75 | 95 | 98 | 98 |
| D + G | 1 + 500 | 30 | 70 | 95 | 98 | 98 |

TABLE L

| Herbicidal effect of Pesticide E in combination with Additive D or E | | | | | | | | |
|---|---|---|---|---|---|---|---|---|
| Pesticide + Additive | g/ha | ZEAMX | BRADC | DIGSA | CHEAL | ABUTH | AMATA | AMBEL |
| E + D | 2 + 1000 | 90 | 90 | 90 | 90 | 98 | 98 | 90 |
| E + E | 2 + 1000 | 65 | 90 | 95 | 98 | 98 | 98 | 95 |

TABLE M

| Herbicidal effect of Pesticide F in combination with Additive D, E, F or G | | | | | | | |
|---|---|---|---|---|---|---|---|
| Pesticide + Additive | g/ha | ZEAMX | SETFA | DIGSA | ABUTH | AMATA | IPOHE |
| F + D | 2 + 1000 | 90 | 75 | 80 | 98 | 98 | 98 |
| F + E | 2 + 1000 | 60 | 85 | 80 | 98 | 98 | 98 |
| F + F | 2 + 1000 | 45 | 75 | 85 | 98 | 98 | 98 |
| F + G | 2 + 1000 | 50 | 85 | 90 | 98 | 98 | 98 |

TABLE N

| Herbicidal effect of Pesticide F in combination with Additive D, E, F or G | | | | |
|---|---|---|---|---|
| Pesticide + Additive | g/ha | ZEAMX | CHEAL | IPOHE |
| F + D | 1 + 500 | 70 | 70 | 95 |
| F + E | 1 + 500 | 35 | 85 | 95 |
| F + F | 1 + 500 | 30 | 85 | 95 |
| F + G | 1 + 500 | 30 | 75 | 95 |

TABLE O

| Herbicidal effect of Pesticide F in combination with Additive D, or E | | | | |
|---|---|---|---|---|
| Pesticide + Additive | g/ha | ZEAMX | DIGSA | AMATA |
| F + D | 1 + 1500 | 60 | 50 | 98 |
| F + E | 1 + 1500 | 35 | 60 | 98 |

TABLE P

| Herbicidal effect of Pesticide G in combination with Additive D, E, or F | | | | | | | |
|---|---|---|---|---|---|---|---|
| Pesticide + Additive | g/ha | ZEAMX | LOLMU | AVEFA | ECHCG | SETFA | BRADC |
| G + D | 2 + 1000 | 95 | 65 | 75 | 95 | 90 | 65 |
| G + E | 2 + 1000 | 25 | 80 | 85 | 95 | 95 | 95 |
| G + F | 2 + 1000 | 25 | 80 | 85 | 95 | 90 | 95 |

TABLE Q

| Herbicidal effect of Pesticide H in combination with Additive D, or E | | | | | | | |
|---|---|---|---|---|---|---|---|
| Pesticide + Additive | g/ha | ZEAMX | ECHCG | SETFA | KCHSC | AMARE | IPOHE |
| H + D | 1 + 500 | 60 | 75 | 95 | 90 | 95 | 98 |
| H + E | 1 + 500 | 25 | 75 | 95 | 95 | 95 | 98 |

TABLE R

| Herbicidal effect of Pesticide H in combination with Additive D, or F | | | | |
|---|---|---|---|---|
| Pesticide + Additive | g/ha | ZEAMX | AMARE | IPOHE |
| H + D | 1 + 500 | 60 | 95 | 98 |
| H + F | 1 + 500 | 25 | 95 | 98 |

TABLE S

| Herbicidal effect of Pesticide J in combination with Additive D, E or F | | | | | | | | | |
|---|---|---|---|---|---|---|---|---|---|
| Pesticide + Additive | g/ha | ZEAMX | GLXMA | BRADC | SETVI | ABUTH | AMATA | AMBEL | IPOHE |
| J + D | 2 + 1000 | 60 | 85 | 55 | 95 | 98 | 90 | 95 | 98 |
| J + E | 2 + 1000 | 50 | 70 | 65 | 95 | 98 | 90 | 95 | 98 |
| J + F | 2 + 1000 | 30 | 65 | 65 | 95 | 98 | 90 | 95 | 98 |

TABLE T

| Herbicidal effect of Pesticide K in combination with Additive D, or F | | | | | | | | |
|---|---|---|---|---|---|---|---|---|
| Pesticide + Additive | g/ha | ZEAMX | LOLMU | SORHA | CHEAL | ABUTH | AMBEL | IPOHE |
| K + D | 16 + 1000 | 40 | 50 | 65 | 85 | 80 | 80 | 95 |
| K + F | 16 + 1000 | 25 | 60 | 85 | 90 | 95 | 90 | 98 |

TABLE U

| Herbicidal effect of Pesticide K in combination with Additive D, or F | | | |
|---|---|---|---|
| Pesticide + Additive | g/ha | ORYSA | CYPIR |
| K + D | 16 + 1000 | 25 | 45 |
| K + F | 16 + 1000 | 20 | 90 |

TABLE V

| Herbicidal effect of Pesticide L in combination with Additive D, or E; assessment was carried out 20 days after treatment | | | |
|---|---|---|---|
| Pesticide + Additive | g/ha | ORYSA | CYPIR |
| L + D | 16 + 1000 | 25 | 50 |
| L + E | 16 + 1000 | 20 | 95 |

TABLE W

| Herbicidal effect of Pesticide B in combination with Additive D, or E | | | | | | | | |
|---|---|---|---|---|---|---|---|---|
| Pesticide + Additive | g/ha | ZEAMX | KCHSC | CHEAL | COM-BE | ABUTH | AMATA | IPOHE |
| B + D | 8 + 500 | 75 | 95 | 95 | 95 | 98 | 98 | 98 |
| B + E | 8 + 500 | 60 | 95 | 95 | 95 | 98 | 98 | 98 |

TABLE X

| Herbicidal effect of Pesticide B in combination with Additive D, or E | | | | | | | | |
|---|---|---|---|---|---|---|---|---|
| Pesticide + Additive | g/ha | GLXMA | SETVI | DIGSA | CHEAL | COM-BE | AMATA | AMA-RE |
| B + D | 2 + 1000 | 95 | 55 | 60 | 80 | 70 | 95 | 85 |
| B + E | 2 + 1000 | 85 | 65 | 70 | 95 | 80 | 98 | 95 |

TABLE Y

| Herbicidal effect of Pesticide B in combination with Additive D, or E; assessment was carried out 20 days after treatment | | | |
|---|---|---|---|
| Pesticide + Additive | g/ha | ORYSA | CYPIR |
| B + D | 8 + 500 | 75 | 65 |
| B + E | 8 + 500 | 55 | 95 |

TABLE Z

| Herbicidal effect of Pesticide B in combination with Additive D, or F | | | | | | | | |
|---|---|---|---|---|---|---|---|---|
| Pesticide + Additive | g/ha | ZEAMX | LOLMU | ECHCG | DIGSA | CHEAL | COM-BE | AMA-RE |
| B + D | 2 + 1000 | 55 | 30 | 50 | 60 | 80 | 70 | 85 |
| B + F | 2 + 1000 | 30 | 60 | 65 | 70 | 98 | 75 | 98 |

TABLE AA

| Herbicidal effect of Pesticide B in combination with Additive D, or G | | | | | | | | |
|---|---|---|---|---|---|---|---|---|
| Pesticide + Additive | g/ha | ZEAMX | SETVI | CHEAL | COM-BE | ABUTH | AMATA | AMBEL |
| B + D | 2 + 1000 | 55 | 55 | 80 | 70 | 90 | 95 | 85 |
| B + G | 2 + 1000 | 35 | 70 | 85 | 80 | 95 | 98 | 90 |

TABLE BB

| Herbicidal effect of Pesticide M in combination with Additive D, or E | | | | | | | | |
|---|---|---|---|---|---|---|---|---|
| Pesticide + Additive | g/ha | ZEAMX | ECHCG | BRADC | SETVI | AMATA | AMBEL | IPOHE |
| M + D | 8 + 500 | 55 | 65 | 75 | 80 | 98 | 95 | 98 |
| M + E | 8 + 500 | 40 | 70 | 80 | 85 | 98 | 95 | 98 |

TABLE CC

| Herbicidal effect of Pesticide M in combination with Additive D, or F | | | | | | |
|---|---|---|---|---|---|---|
| Pesticide + Additive | g/ha | ZEAMX | GLXMA | SETVI | AMBEL | IPOHE |
| M + D | 2 + 1000 | 35 | 80 | 50 | 75 | 95 |
| M + F | 2 + 1000 | 30 | 70 | 55 | 85 | 98 |

TABLE CC

| Herbicidal effect of Pesticide M in combination with Additive D, or G | | | | |
|---|---|---|---|---|
| Pesticide + Additive | g/ha | ZEAMX | ABUTH | AMBEL |
| M + D | 2 + 1000 | 35 | 90 | 75 |
| M + G | 2 + 1000 | 30 | 95 | 90 |

The results show a reduced phytotoxicity of the liquid herbicidal compositions according to the invention as compared to compositions with the commercially important Additive D.

EXAMPLE-3: COMPARATIVE EXPERIMENTS ON BIOLOGICAL EFFICACY AND PHYTOTOXICITY

The selectivity and herbicidal activity of different liquid herbicidal compositions according to Table DD combining various Pesticides and Additives were assessed by greenhouse experiments as described for Example-2. Specifically, Pesticide G, falling under the definition of compounds of formula (II) in combination with Additive D or E were assessed in comparison with diphenylether Pesticides N and P. Table DD summarizes the results.

TABLE DD

| Comparison of herbicidal activity of Pesticide G vs diphenylether Pesticides N or P | | | |
|---|---|---|---|
| Pesticide + Additive | g/ha | ZEAMX | ECHCG |
| G + D | 2 + 1000 | 95 | 95 |
| G + E | 2 + 1000 | 25 | 95 |
| N + D | 256 + 1000 | 65 | 90 |
| N + E | 256 + 1000 | 70 | 85 |
| N + D | 128 + 1000 | 40 | 80 |

TABLE DD-continued

| Comparison of herbicidal activity of Pesticide G vs diphenylether Pesticides N or P | | | |
|---|---|---|---|
| Pesticide + Additive | g/ha | ZEAMX | ECHCG |
| N + E | 128 + 1000 | 55 | 80 |
| P + D | 128 + 1000 | 70 | 75 |
| P + E | 128 + 1000 | 75 | 75 |

EXAMPLE-4: COMPARATIVE EXPERIMENTS ON BIOLOGICAL EFFICACY AND PHYTOTOXICITY

The selectivity and herbicidal activity of different liquid herbicidal compositions according to Table EE combining various Pesticides, Additives, and the ammonium salt of glufosinate ("GFA") were assessed by greenhouse experiments as described for Example-2. Table EE summarizes the results.

Synergism can be described as an interaction where the combined effect of two or more compounds is greater than the sum of the individual effects of each of the compounds. The presence of a synergistic effect in terms of percent control, between two mixing partners (X and Y) can be calculated using the Colby equation (Colby, S. R., 1967, Calculating Synergistic and Antagonistic Responses in Herbicide Combinations, *Weeds,* 15, 20-22):

$$E = X + Y - \frac{XY}{100}$$

When the observed combined control effect is greater than the expected combined control effect (E), then the combined effect is synergistic.

The following tests demonstrate the control efficacy of compounds, mixtures or compositions of this invention. The analysis of synergism or antagonism in Table EE between the mixtures or compositions was determined using Colby's equation.

TABLE EE combination experiments of Additives with GFA and Pesticide F

| (Pesticides) + Additive | g/ha | ORYSA | expected by Colby (x + y − (x*y/100)) | LEFFI | expected by Colby (x + y − (x*y/100)) |
|---|---|---|---|---|---|
| F + D | 1 + 500 | 25 | | 40 | |
| GFA + D | 150 + 500 | 30 | | 25 | |
| (F + GFA) + D | 1 + 150 + 1000 | 40 | 48 | 30 | 55 |
| F + E | 1 + 500 | 25 | | 50 | |
| GFA + E | 150 + 500 | 40 | | 15 | |
| (F + GFA) + E | 1 + 150 + 1000 | 35 | 55 | 80 | 58 |

The results showed that Additive E only conferred improved control of weeds and reduced phytotoxicity as compared to Additive D if admixed to Pesticide F or a composition containing Pesticide F.

The invention claimed is:

1. A liquid herbicidal composition comprising a) a protoporphyrinogen-IX oxidase inhibitor, or an agrochemically acceptable salt, stereoisomer, tautomer, or N-oxide thereof;

b) a compound of formula (I)

$$[R\text{-}(A)_x\text{-}OSO_3^-]\text{-}M^+ \quad (I);$$

wherein

R is $C_{10}$-$C_{16}$-alkyl, $C_{10}$-$C_{16}$-alkenyl, or $C_{10}$-$C_{16}$-alkynyl;

each A is independently a group

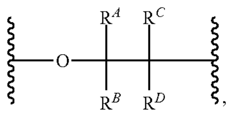

wherein $R^A$, $R^B$, $R^C$, and $R^D$ are independently H, $CH_3$, or $CH_2CH_3$ with the proviso that the sum of C-atoms of $R^A$, $R^B$, $R^C$, and $R^D$ is up to 2;

$M^+$ is monoethanolammonium, an alkali metal ion, or a mixture thereof; and the index x is a number from 1 to 3;

wherein the protoporphyrinogen-IX oxidase inhibitor is a compound of formula (II)

(II)

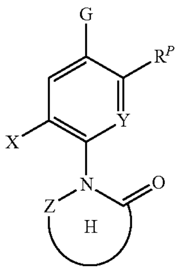

wherein the variables have the following meaning

X is H, F, or Cl;

Y is CH, or N;

Z is C(═O), or N;

H is a 5- to 9-membered saturated, partially unsaturated, or fully unsaturated heterocyclic ring or ring system, wherein said heterocyclic ring or ring system comprises one or more, same or different heteroatoms O, N, or S in addition to the N-atom that connects the ring H to the remainder of formula (II), and is unsubstituted, or substituted with one or more, same or different substituents $R^H$, and wherein said N- and S-atoms are independently oxidized, or non-oxidized;

$R^H$ is $C_1$-$C_4$-alkyl, which is unsubstituted, or halogenated;

or two geminal substituents $R^H$ form together with the atom to which they are bound a group ═O, ═S, or ═C $(CH_3)_2$;

$R^P$ is selected from the following groups $R^{P1}$ to $R^{P10}$;

($R^{P1}$)

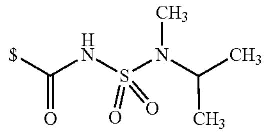

($R^{P2}$)

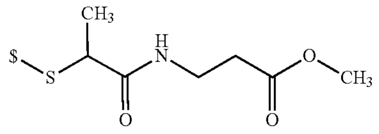

($R^{P3}$)

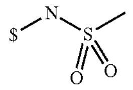

($R^{P4}$)

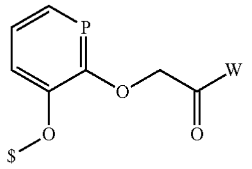

($R^{P5}$)

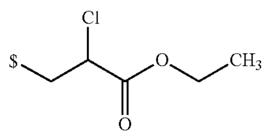

($R^{P6}$)

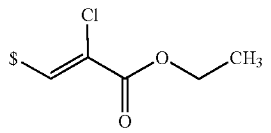

-continued (R$^{P7}$)

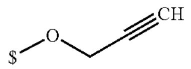

(R$^{P8}$)

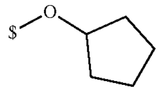

(R$^{P9}$)

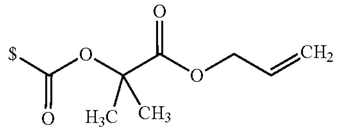

(R$^{P1}$)

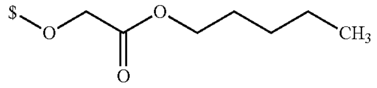

wherein $ means the connection to the remainder of the molecule; wherein P is CH or N; and wherein W is $OCH_3$, $OCH_2CH_3$, or $NHSO_2CH_3$;

G is Cl;

or G and R$^P$ form together one of the following groups (II-A) or (II-B)

(II-A)

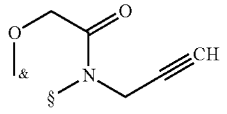

(II-B)

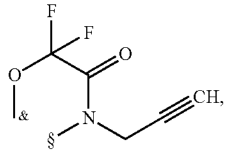

wherein & means the connection to the remainder of the molecule at the carbon atom to which the variable G is connected in formula (II), and wherein § means the connection to the remainder of the molecule at the carbon atom to which the variable R$^P$ is connected in formula (II), and wherein the protoporphyrinogen-IX oxidase inhibitor is present in a particulate form as suspended solid particles.

2. The composition according to claim 1, wherein R$^A$, R$^B$, R$^C$, and R$^D$ are H.

3. The composition of claim 1, wherein the monovalent cation $M^+$ is $Na^+$.

4. The composition according to claim 1, comprising a) 5 to 50 wt % of the protoporphyrinogen-IX oxidase inhibitor, or an agrochemically acceptable salt, stereoisomer, tautomer, or N-oxide thereof;

b) 5 to 60 wt % of the compound of formula (I).

5. The composition according to claim 1 comprising an amine component selected from primary, secondary, tertiary amines, and ammonium salts thereof, and quaternary ammonium salts;

wherein the molecular weight of the primary, secondary or tertiary amines, of the ammonium cation in the ammonium salts, or of the quaternary ammonium cation in the quaternary ammonium salts is from 32 to 200 g/mol;

and wherein $M^+$ in formula (I) is different from the cations in the ammonium salts or quaternary ammonium salts in the amine component.

6. A method for controlling undesirable vegetation, which method comprises applying the herbicidal composition as defined in claim 1 to a locus where undesirable vegetation is present or is expected to be present.

7. The composition according to claim 1, wherein the protoporphyrinogen-IX oxidase inhibitor is selected from the group consisting of saflufenacil; trifludimoxazin; tiafenacil; ethyl [3-[2-chloro-4-fluoro-5-(1-methyl-6-trifluoromethyl-2,4-dioxo-1,2,3,4-tetrahydropyrimidin-3-yl) phenoxy]-2-pyridyloxy]acetate; epyrifenacil; 2-[[3-[[3-chloro-6-[3,6-dihydro-3-methyl-2,6-dioxo-4-(trifluoromethyl)-1 (2H)-pyrimidinyl]-5-fluoro-2-pyridinyl]oxy]-2-pyridinyl] oxy]-aceticacid methyl ester; 2-[[3-[[3-chloro-6-[3,6-dihydro-3-methyl-2,6-dioxo-4-(trifluoromethyl)-1 (2H)-pyrimidinyl]-5-fluoro-2-pyridinyl]oxy]-2-pyridinyl]oxy] acetic acid ethyl ester; 2-[[3-[[3-chloro-6-[3,6-dihydro-3-methyl-2,6-dioxo-4-(trifluoromethyl)-1 (2H)-pyrimidinyl]-5-fluoro-2-pyridinyl]oxy]-2-pyridinyl]oxy]-N-(methylsulfonyl)-acetamide; 2-[2-[[3-chloro-6-[3,6-dihydro-3-methyl-2,6-dioxo-4-(trifluoromethyl)-1 (2H)-pyrimidinyl]-5-fluoro-2-pyridinyl]oxy]phenoxy] acetic acid ethyl ester; ethyl 2-[[3-[2-chloro-5-[4-(difluoromethyl)-3-methyl-5-oxo-1,2,4-triazol-1-yl]-4-fluoro-phenoxy]-2-pyridyl]oxy] acetate; sulfentrazone; carfentrazone-ethyl; and flumioxazin.

* * * * *